United States Patent [19]

Haber et al.

[11] 4,132,793

[45] Jan. 2, 1979

[54] STABLE RED BEET COLOR COMPOSITION

[75] Inventors: George J. Haber, Staten Island, N.Y.; Chee T. Tan, Middletown; Joanna Wu, Matawan, both of N.J.

[73] Assignee: International Flavors & Fragrances Inc., New York, N.Y.

[21] Appl. No.: 824,769

[22] Filed: Aug. 15, 1977

[51] Int. Cl.² .............................................. A23L 1/275
[52] U.S. Cl. ..................................... 426/250; 426/96; 426/540; 8/53
[58] Field of Search .............. 426/250, 540, 546, 271, 426/96; 8/53, 80

[56] References Cited

U.S. PATENT DOCUMENTS 3,998,753  12/1976  Antoshkiev ......................... 426/250

FOREIGN PATENT DOCUMENTS 51-18512  2/1976  Japan.

OTHER PUBLICATIONS

"Food Processing" May 1973, p. B-72 (advertisement of Hansen's Laboratory, Inc. of Milwaukee, Wisconsin).

"Color-Treme R-111" Bulletin S-235, Color-Treme Co, (Division of Beatrice Foods Co. of Beloit Wisconsin).

*Primary Examiner*—Raymond N. Jones
*Assistant Examiner*—Elizabeth A. Hatcher
*Attorney, Agent, or Firm*—Arthur L. Liberman; Franklin D. Wolffe; Harold Haidt

[57] ABSTRACT

Described is a novel composition of matter which is a natural red dyestuff composed of the ingredients:
 (i) a betalaine (red beet dye);
 (ii) Ascorbic acid or derivative or salt thereof (e.g. sodium ascorbate or isoascorbic acid [D-erythro-hex-2-enonic acid gamma lactone]);
 (iii) A phosphate (such as sodium hexametaphosphate and/or tetrasodiumphosphate) and, optionally,
 (iv) Ethylenediaminetetraacetic acid or a salt thereof.

In addition, the foregoing composition may contain caramel color.

Also described are processes of preparing such compositions and processes of adding same to foodstuffs, chewing gums and medicinal products.

7 Claims, 15 Drawing Figures

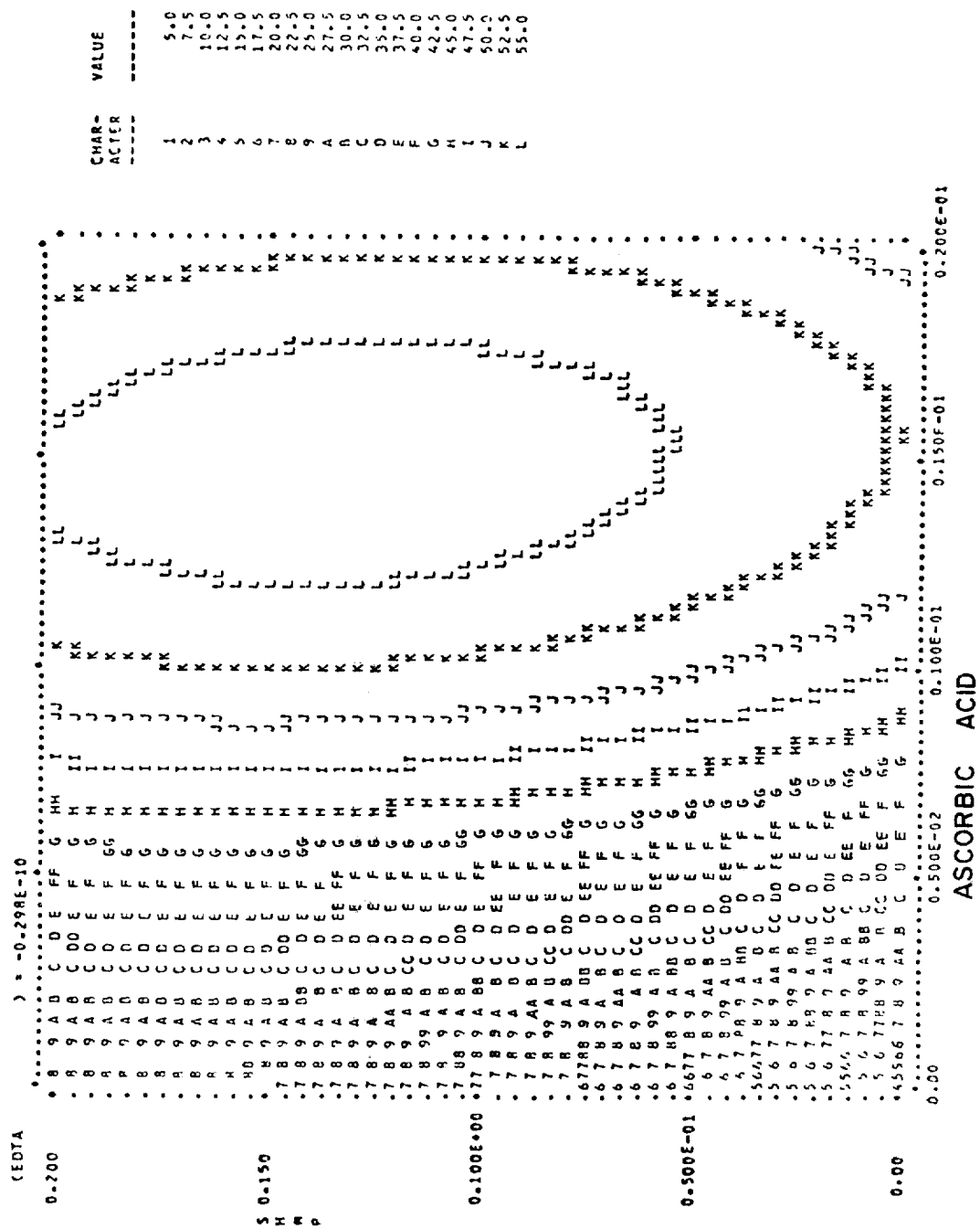

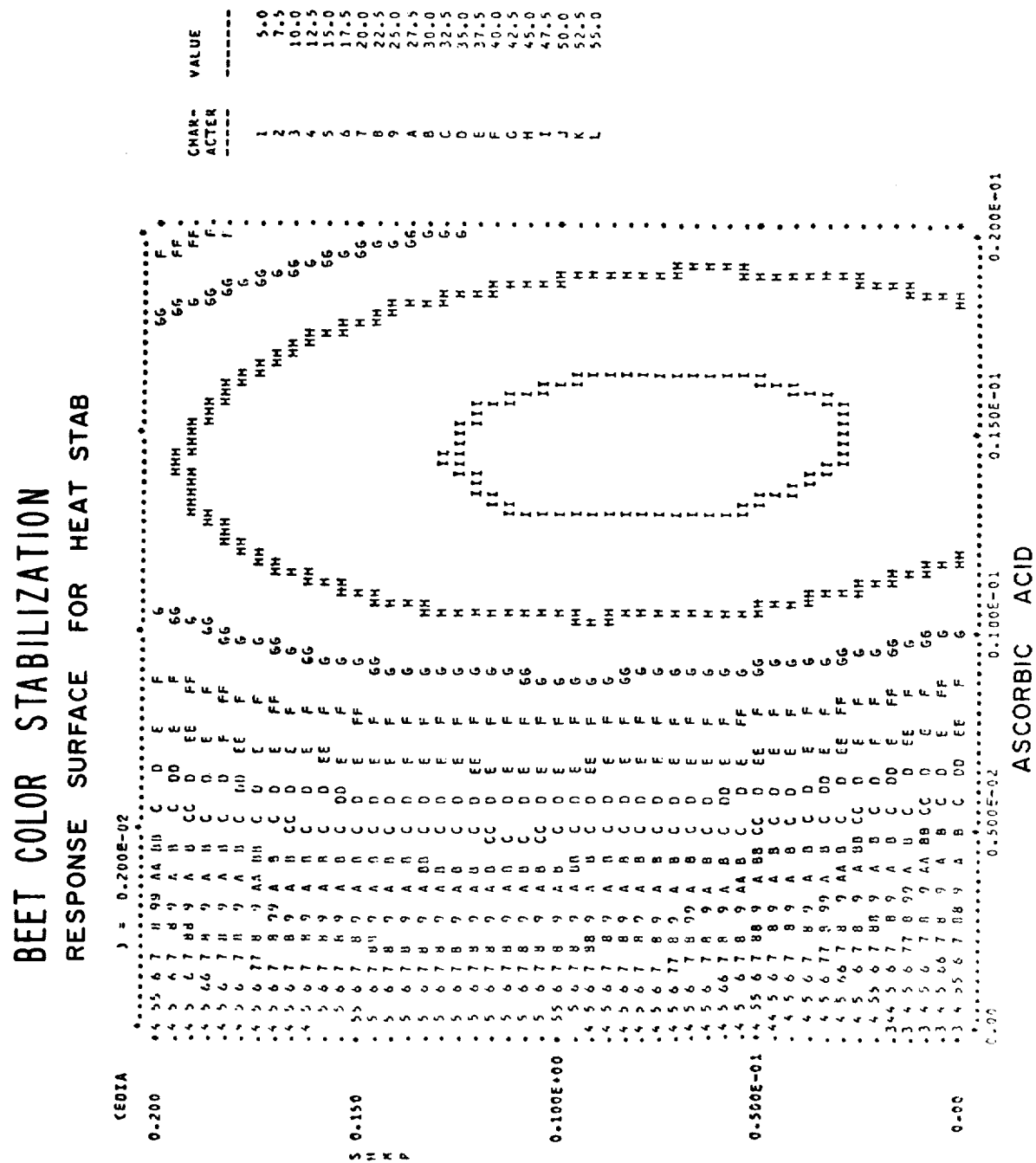

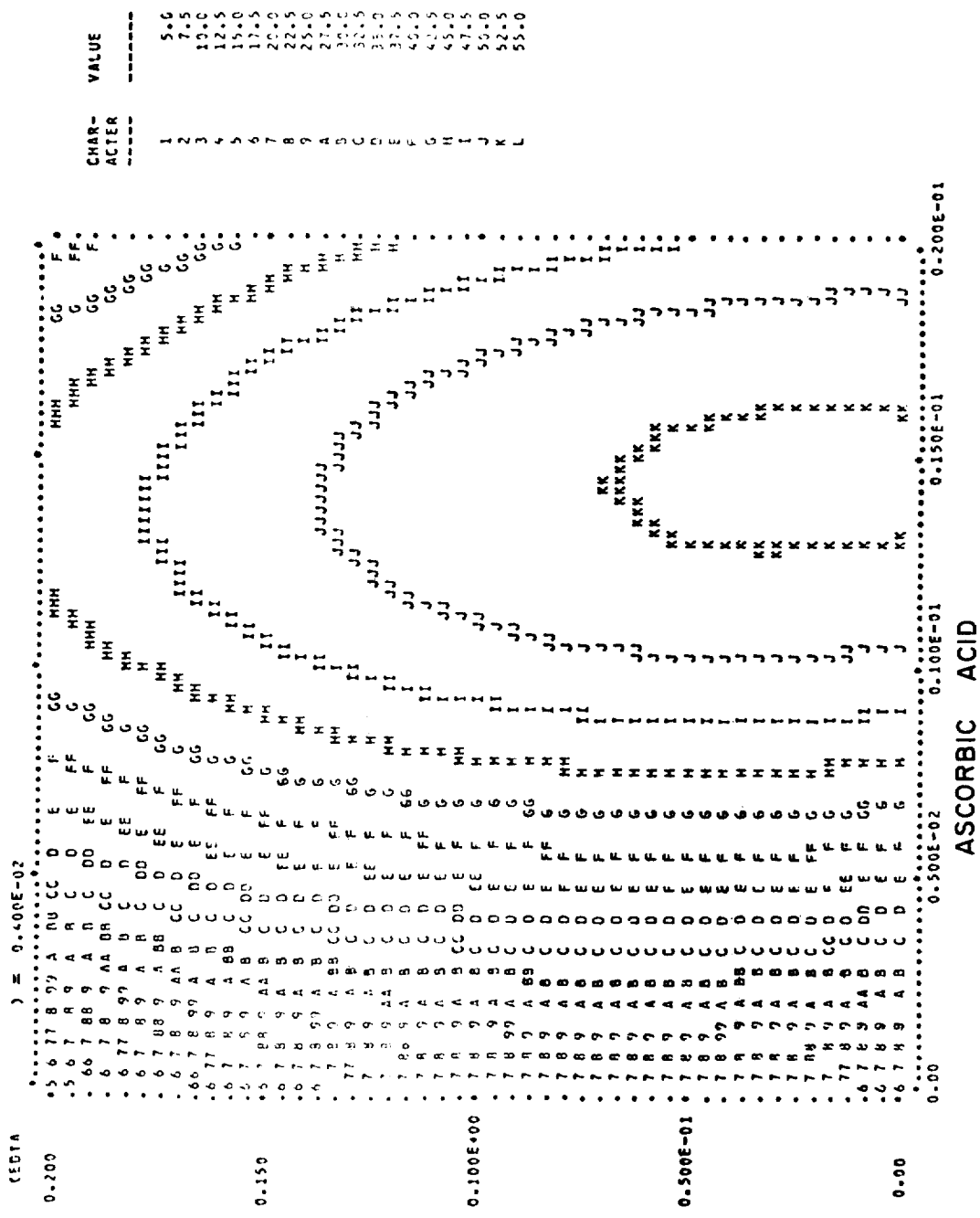

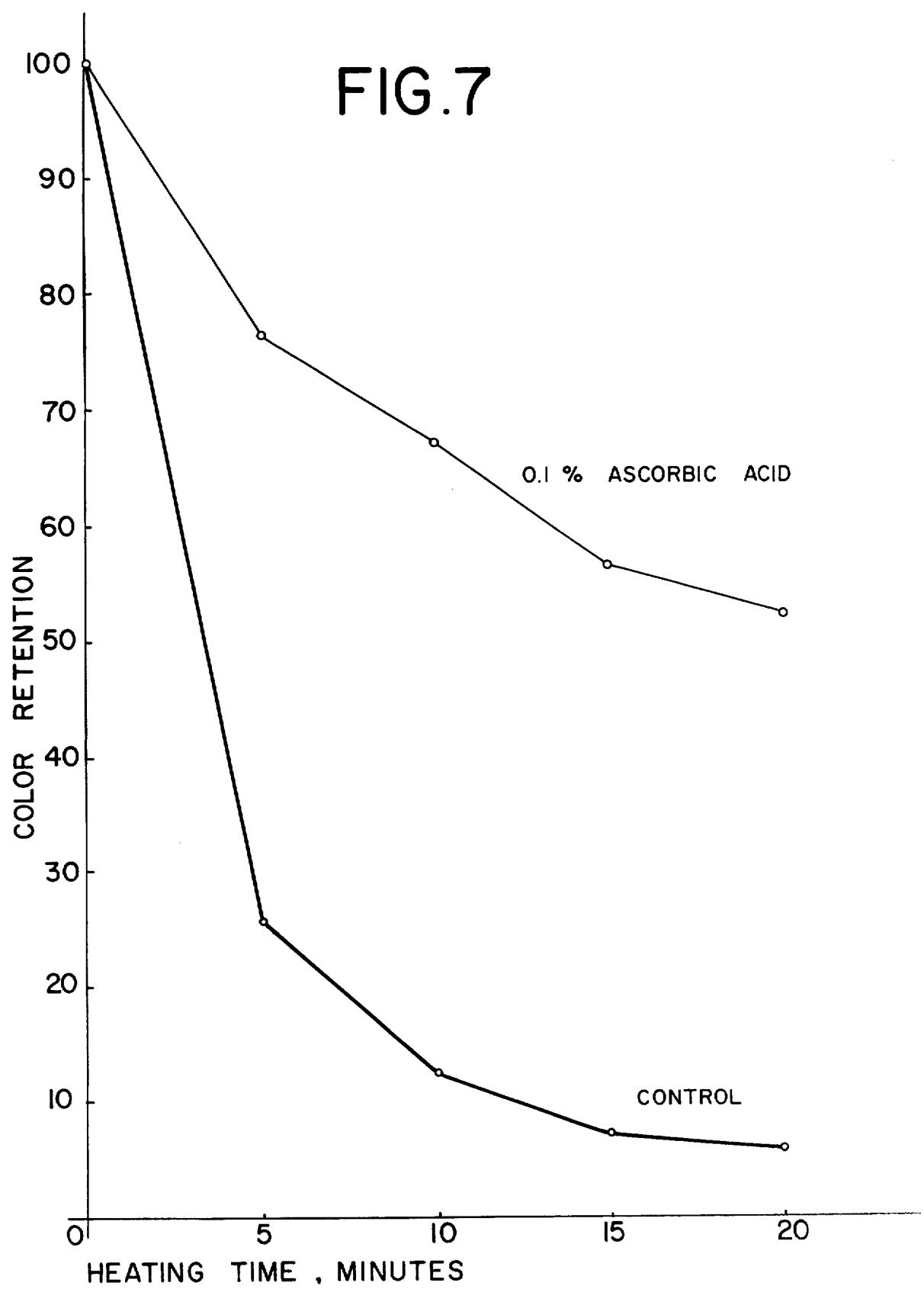

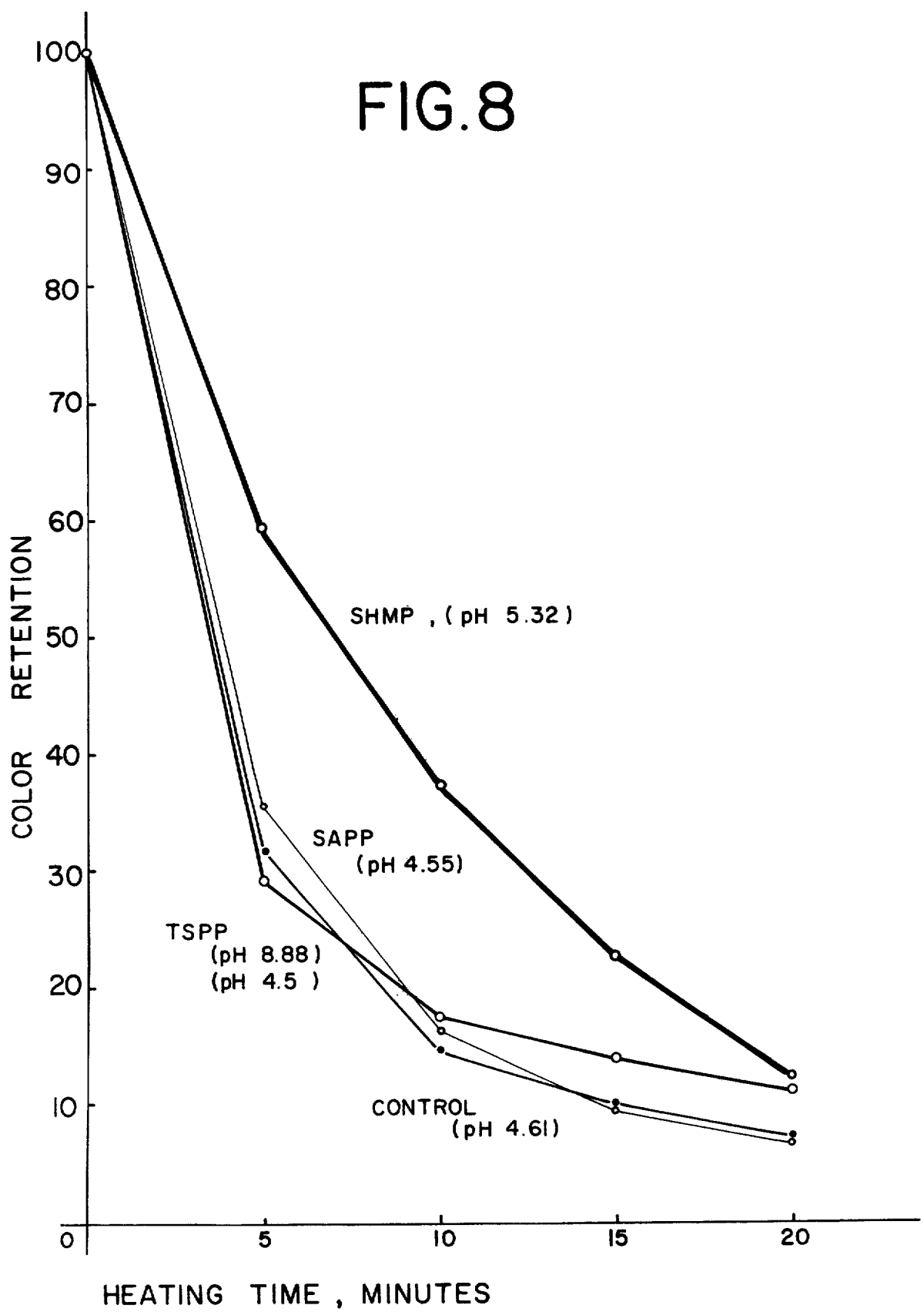

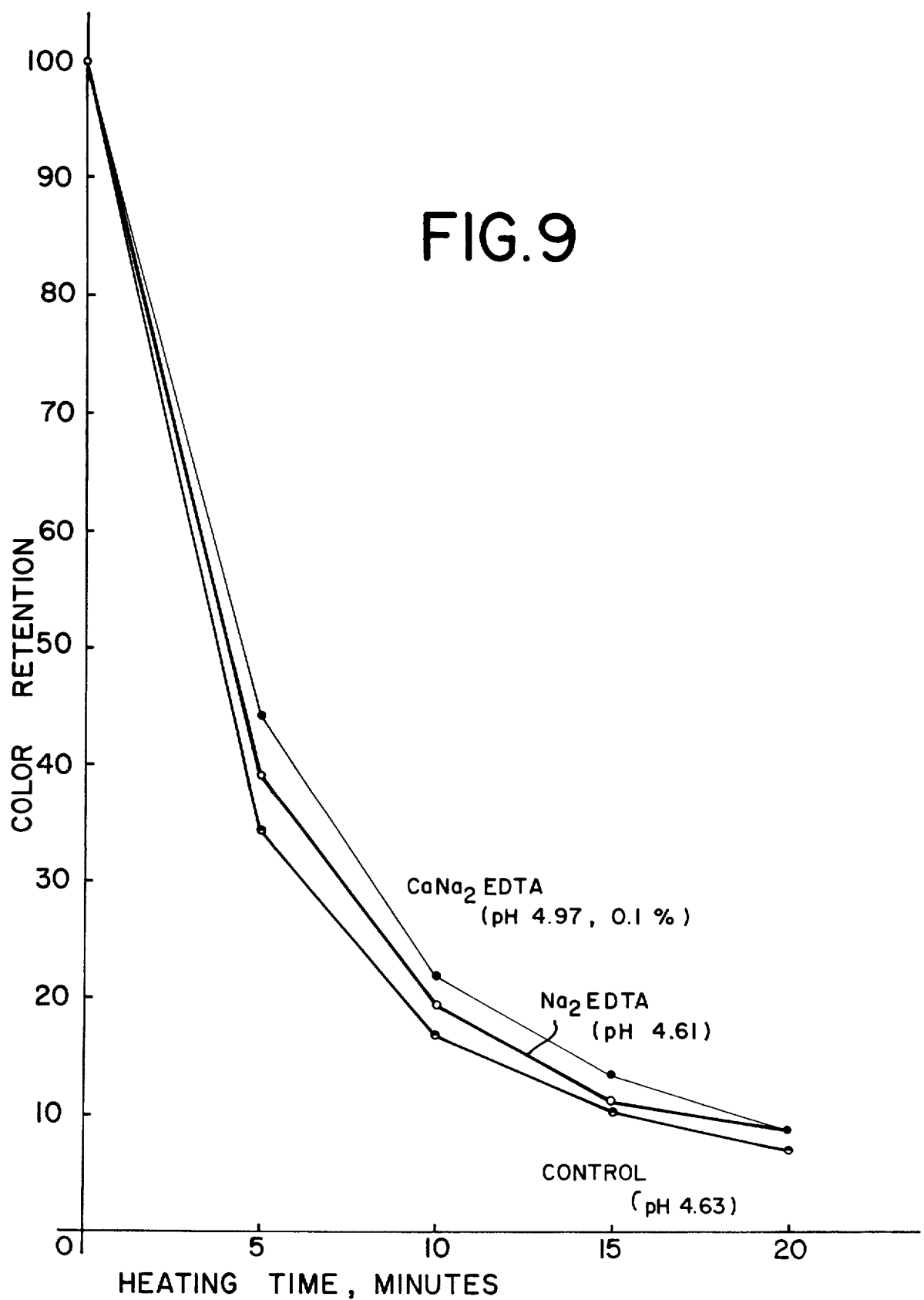

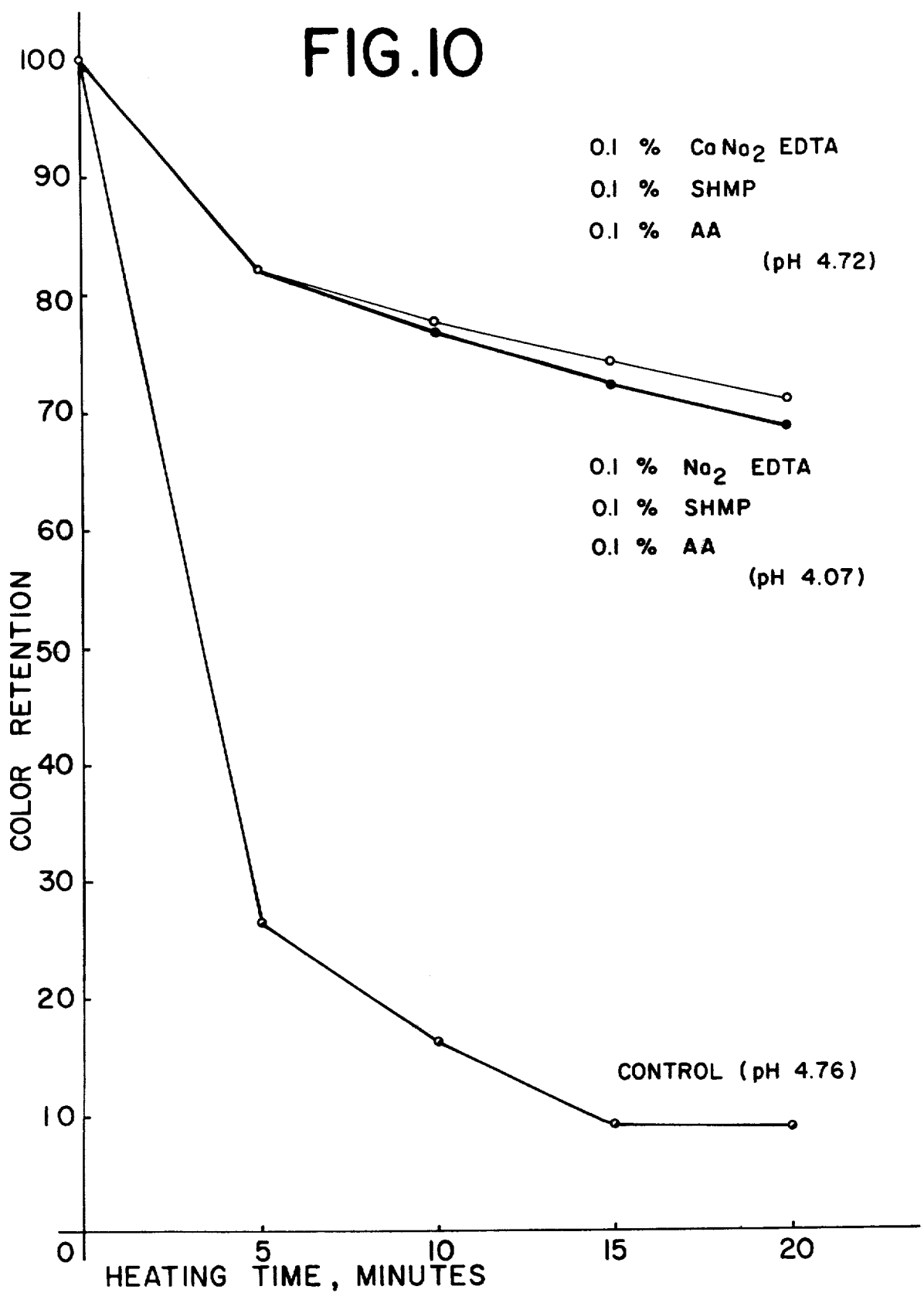

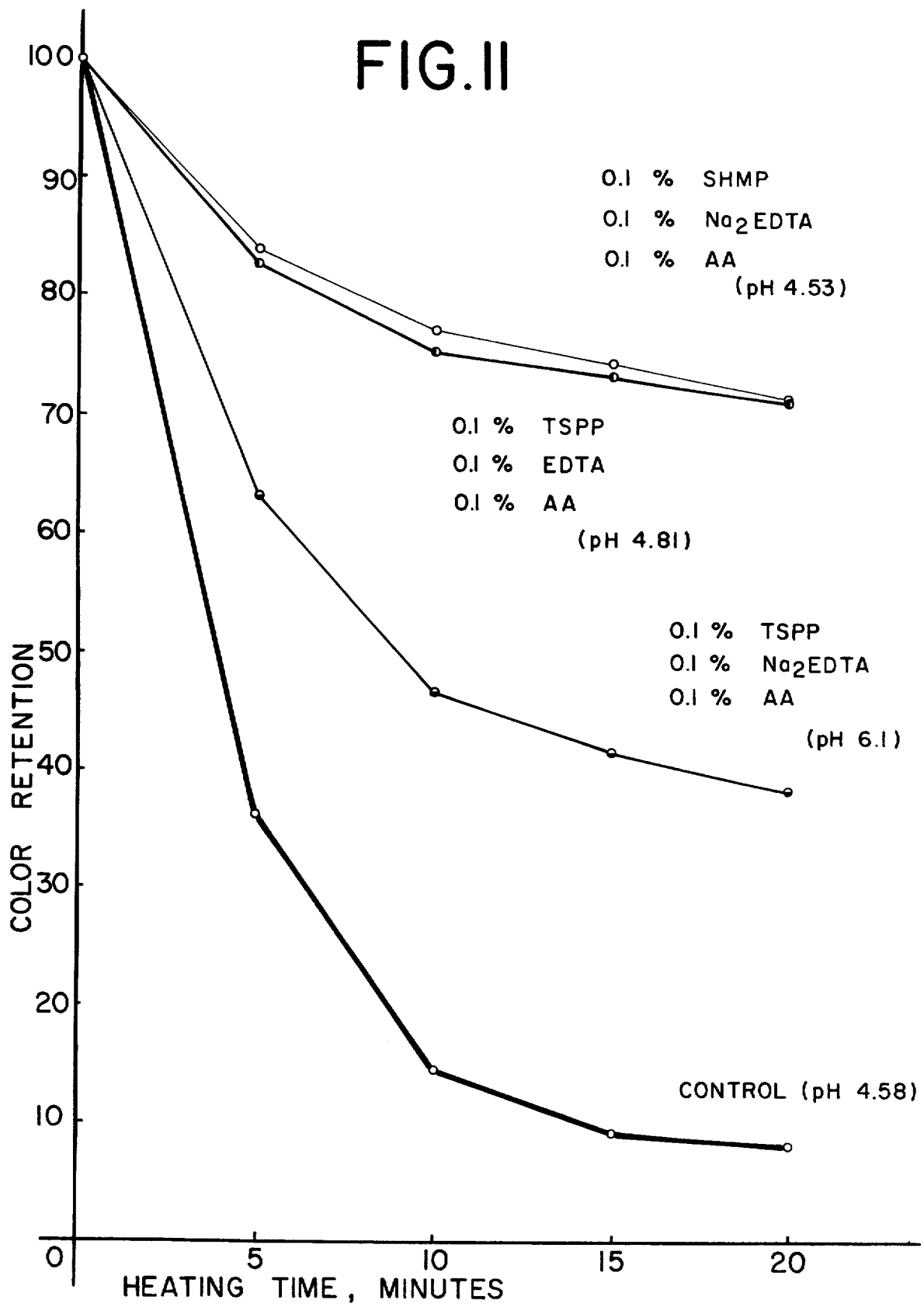

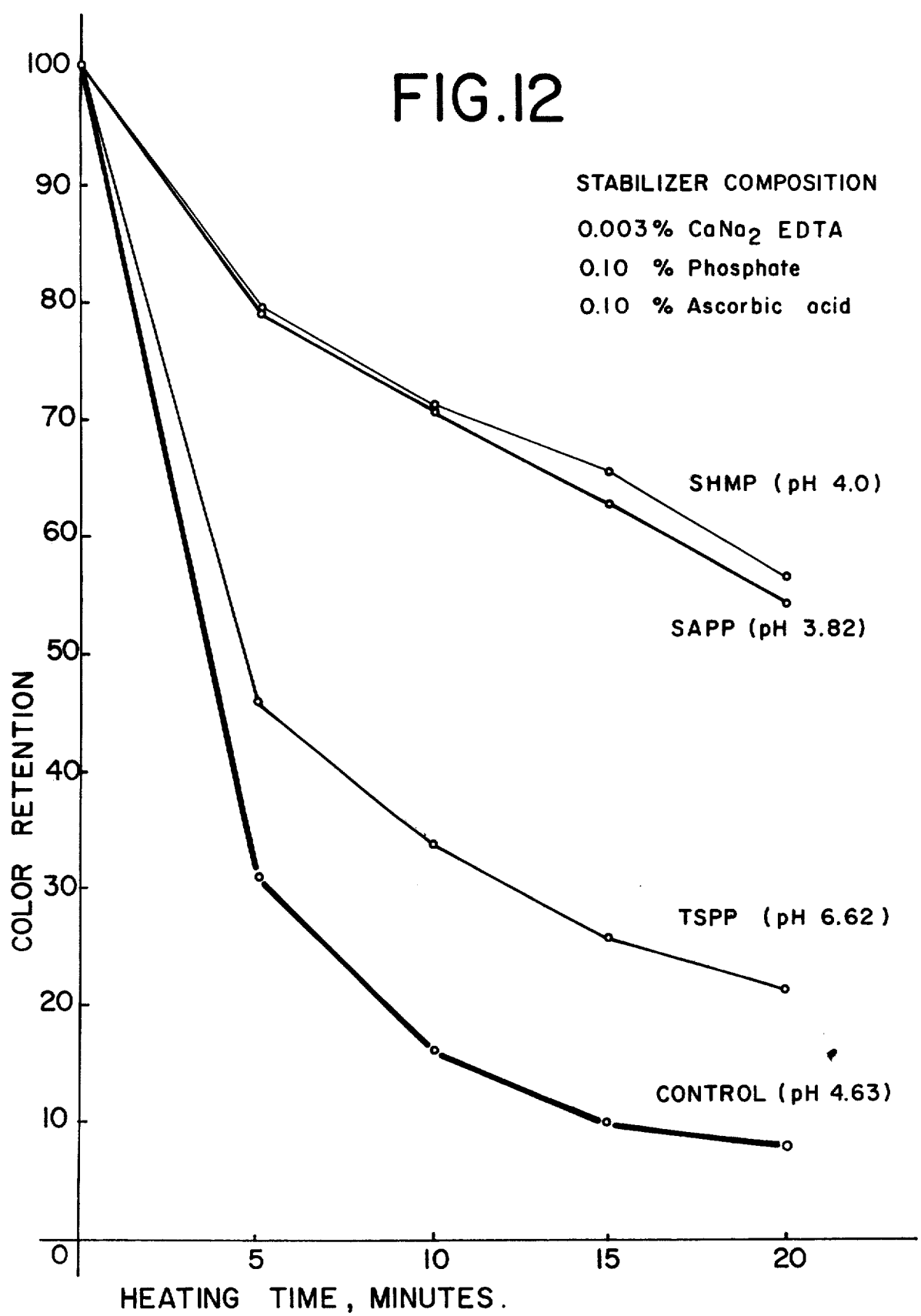

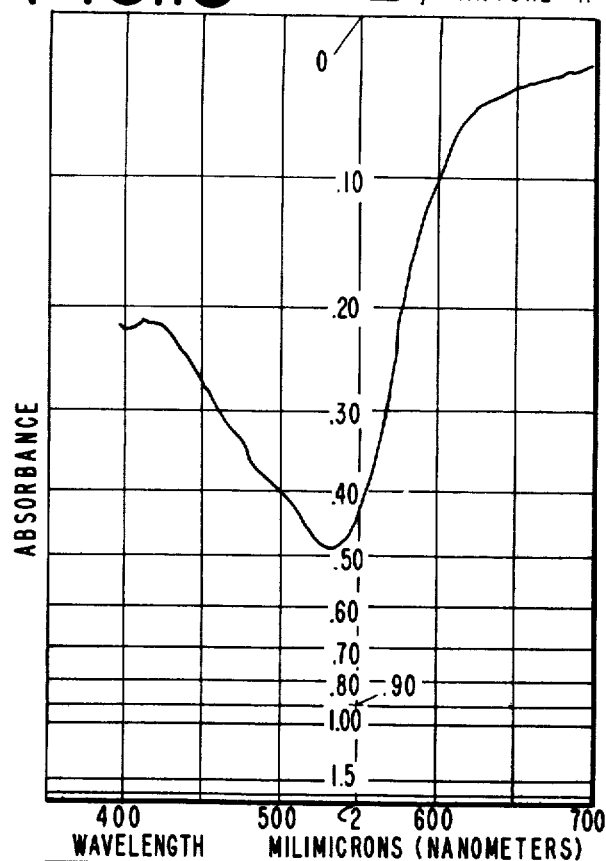
FIG.13 EXAMPLE IV, MIXTURE "A"
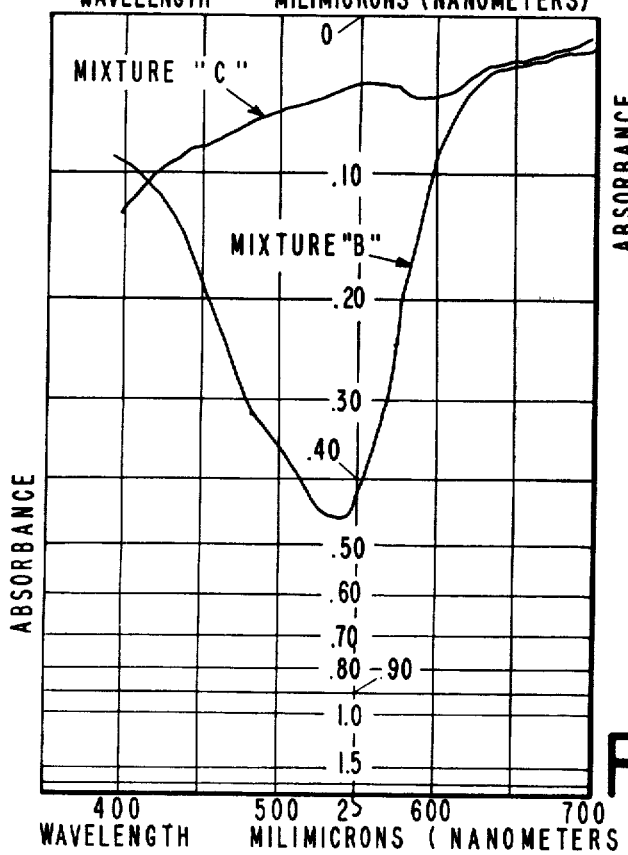
FIG.14 EXAMPLE IV, MIXTURES "B" AND "C"
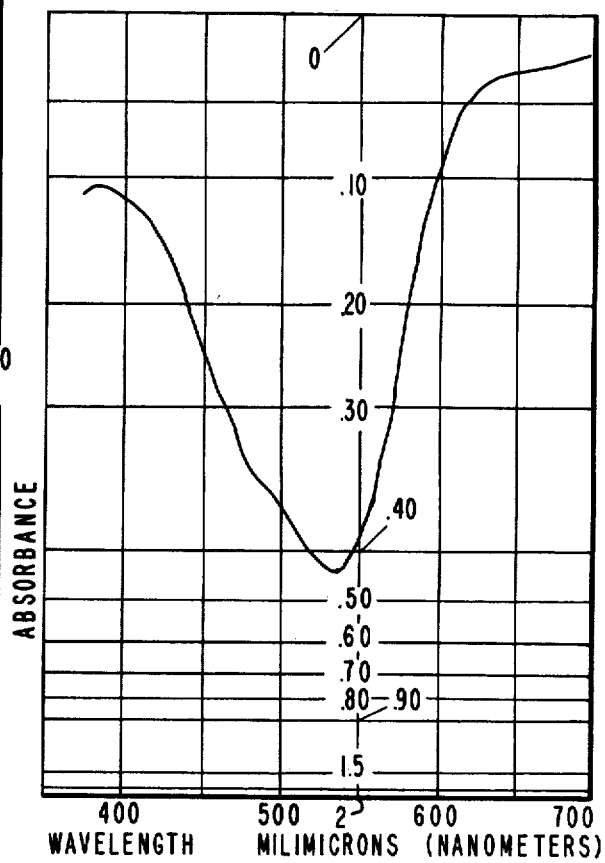
FIG.15 EXAMPLE IV, MIXTURE "D"

STABLE RED BEET COLOR COMPOSITION

BACKGROUND OF THE INVENTION

Synthetic red dyestuffs such as F.D.&C. #2 and F.D.&C. #40 have heretofore been found to be unsuitable for use in conjunction with foodstuffs, e.g., ice creams and maraschino cherries. The present invention provides a natural red dyestuff composition having the same intensity and quality of red color as the heretofore known synthetic red dyes, and with colorfastness and brightness comparable to the previously known synthetic dyestuffs.

The use of ascorbic acid for stabilization of red vegetable dyes is disclosed in Japanese Pat. No. J7 7,009,741 issued on Mar. 18, 1977, (Title: "Vegetable Dye Extract Useful for Food Products").

Natural red dyestuffs and methods for extracting same from plants are well documented in the prior art as follows:
  (i) Pages 45, 175 and 176 of the text "Nature's Colors: Dyes from Plants," Grae, MacMillan Publishing Company (1974);
  (ii) Pages 70 and 85 of the book "Dye Plants and Dyeing—A Hand Book" (Special Printing of "Plants and Gardens" Volume 20, #3, 1964, Brooklyn Botanical Garden);
  (iii) U.S. Pat. No. 207,271, issued on Aug. 20, 1878, (Title: "Improvement in Processes of Treating Beet Roots for the Manufacture of Sugar");
  (iv) U.S. Pat. No. 2,567,362, issued on Sept. 11, 1951, (Title: "Method of Extracting Pigments from Plants"); and
  (v) U.S. Pat. No. 2,799,588, issued on July 16, 1957, (Title: "Process for the Production of Color Bodies from Fresh Vegetables").

As specified in "Natural Coloring Matters," Mayer, ACS Monograph, 1948, the pigment of red cabbage (Brassica oleracea) is the anthocyanin derivative, rubrobrassicin. As stated in Kirk and Othmer, Encyclopedia of Chemical Technology, Second Edition, Volume 10, page 7, anthocyanins are used in foods as natural coloring matters. The nature of the extraction processes is further disclosed in Hayashi's chapter on Anthocyanins in "The Chemistry of Flavanoid Compounds," Geissman, The MacMillan Company, 1962, pages 252–255. Recent developments concerning the chemistry and stability of anthocyanins is also disclosed in a paper delivered by F. J. Francis at the March, 1977, American Chemical Society Symposium at New Orleans, LA.

U.S. Pat. No. 1,243,042, issued on Oct. 16, 1917, covers the production of dyestuffs by extracting coloring materials of banana class plant substances.

Von Georgievics, "Chemistry of Dyestuffs," Scott, Greenwood and Company, London, 1903, at pages 361–386 (Dyestuffs of Vegetable Origin) sets forth various vegetable dyes and methods for producing same.

Betanine, the red beet dye having the empirical formula $C_{24}H_{26}O_{13}N_2$ is a betalaine which, although being a red dye, forms a glistening bronze green crystal which may be degraded to glucose and Betanidine hydrochloride, $C_{18}H_{17}O_8HCl$, an amorphous purple material with a green sheen which is very sensitive towards oxygen. Its appearance is described on page 232 of the Mayer Monograph "Natural Coloring Matters" ACS Monograph Series, 1943. Its chemical structure is set forth in Mabry et al, Tetrahedron, 23 3111 (1967). In addition, biosynthesis of betalaines is discussed by Dunkelblum et al, Helv.Chim.Acta, Vol. 55, Fasc. 2 (1972) 642.

Furthermore, the use of combinations of caramel color and other dyestuffs has heretofore been disclosed in U.S. Pat. No. 2,841,499, issued on July 1, 1958 U.S. Pat. No. 2,841,499 provides a dry food composition comprising caramel color and/or a certified dye, e.g. amaranth F.D.&C #2, which produces, on mixing with water, a product in which the color is indicated to be thoroughly and evenly distributed throughout the mass of the hydrated product. The object of U.S. Pat. No. 2,841,499 was to provide a method of coloring food products of the type which are sold as dry powders that are made ready for use by the addition of water, with the color being primarily provided by caramel coloring. The ratio of the caramel color to other certified dyes as disclosed in the examples of U.S. Pat. No. 2,841,499 is shown to be about 80:1. U.S. Pat. No. 2,841,499 does not provide a composition or method for augmenting or stabilizing or enhancing or intensifying the red color of a natural red dyestuff, however.

In addition, combinations of red vegetable dyestuffs and caramel are disclosed in the following publications:
  (i) Meer Corporation Technical Information Bulletin P-283 (Title: "Black Cherry Color Blend #200 (Liquid) and #260 (Powder)" (Publication date estimated to be in 1976);
  (ii) Meer Corporation Technical Information Bulletin F-132 (Title: "Natural Tomato Color Blend #270 (Liquid) and #286 (Powder)" estimated publication date 1976);
  (iii) Food Processing, May 1973, page B-72 (Advertisement of Hansen's Laboratory, Inc. of Milwaukee, Wisc.); and
  (iv) Meer Corporation Technical Information Bulletin P-285 (Title: "Natural Raspberry Color Blend #201 (Liquid) and #261 (Powder)" estimated publication date 1976).

Also, the use of red vegetable dyes stabilized with ascorbic acid is disclosed in Food Processing, May 1973, page B-72 (Advertisement of Hansen's Laboratory, Inc. of Milwaukee, Wisc.

Color-Treme Company, (Division of Beatrice Foods Company of Beloit, Wisconsin) has published the specifications of their Liquid Beet Juice Concentrate, "COLOR-TREME R-111" Bulletin S-235, as follows:

| | |
|---|---|
| Color Index: | 1.7–2.3% |
| Total Color by test: | 0.5% minimum |
| Solids Content: | 65.0–70.0% |
| pH Range: | 4.3–4.5% |
| Storage: | 40° F. maximum |
| Sediment: | 0 |
| Foreign Material: | 0 |
| Odor & Flavor: | Comparable to standard |
| MICROBIOLOGICAL SPECIFICATIONS | |
| (Specifications matching liquid sugar) | |
| E. Coli: | Less than 10/gram |
| Coagulase & Staphlococcus: | Less than 100/gram |

-continued

| Coliform: | Less than 10/gram |
| Yeast & Mold: | Less than 100/gram |
| Standard Plate Count: | Less than 100/gram |

EFFECT OF COMMON FOOD ADJUNCTS ON SYSTEMS CONTAINING COLOR-TREME R AND P SERIES

These recommendations described below are based on model systems testing and are intended as guidelines in determining the best adjuncts to be used with Color-Tremes in various food systems.

A) pH Effects

The recommended pH range in which to use Color-Treme would be from 3.0 to 6.5. The apparent optimum pH for most systems is between pH 4.0 to 6.0. Color stability and hue may vary significantly when the pH is outside the recommended range.

B) Effect to Acidulants - pH adjusted to 4.2

Of the commonly used food acidulants, those found to be most acceptable in combination with Color-Treme are:
  Phosphoric, citric, malic, lactic and fumaric
An acidulant found to be unacceptable was adipic.
Ascorbic causes some side effects on the color which also may be unacceptable.

C) Effect of Preservatives - pH adjusted to 4.2

The recommended systems to be used in conjunction with Color-Treme are Potassium Sorbate and/or Sodium Benzoate. Sulfites and Bisulfites have a negative effect.
Sodium Sulfate has no apparent effect. Propionic acid should be avoided as some negative effects have been noted.

D) Effect of Phosphates and Chelating Agents - pH adjusted to 4.2

Seven of the phosphates and chelating agents were tested and each was found to have a positive effect in extending the life of the Color-Treme.
The best results were obtained with Sodium EDTA and Sodium Hexameta Phosphate.
Improvements were also noted with Di Sodium Phosphate, Tetra Sodium Pyro Phosphate, Tri Sodium Phosphate, Sodium Aluminum Phosphate and Potassium Phosphate.

E) Effect of Cationic Salts on Color-Treme - pH adjusted to 4.2

In general, if cationic salts are to be used, mono-valent salts are preferred. Those showing the most degradation in terms of color stability are di and poly-valent salts such as $Fe++$, $Ca++$, $Al+++$, $Mg++$ and $Cu++$.

F) Effect of Anions on Color-Treme - pH adjusted to 4.2

Many Anions are used in food systems as buffering agents. The most acceptable for use in Color-Treme containing products were found to be Acetate, Lactate, Citric and Tartrate. Sulfates were found to have no effect, whereas sulfites were found to have a negative effect.
Carbonates have a pronounced negative effect on Color-Treme.

G) Effect of Color Concentration - pH adjusted to 4.2

Stability problems can be overcome in many systems by increasing the overall color level in the system. This has been demonstrated in a model system where a ten-fold increase in color concentration resulted in greater than a 100% increase in shelf-life of the color The year of this publication is 1977.

THE INVENTION

This invention concerns the stabilization of red beet color using ascorbic acid or derivative or salt thereof (e.g. sodium ascorbate or isoascorbic acid), phosphates and, optionally, ethylenediaminetetraacetic acid or one or more salts thereof. Isoascorbic acid is D-erythro-hex-2-enonic acid gamma lactone having the structure:

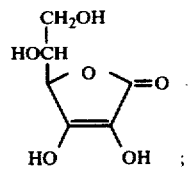

ascorbic acid is L-3-ketothreohexuronic acid lactone having the structure:

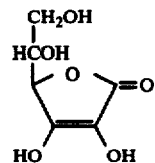

Although the stabilized red beet dye in admixture with the stabilizing quantities of ascorbic acid (or derivative thereof), phosphate and, optionally, ethylenediaminetetraacetic acid (or salt thereof) would have a somewhat lesser initial color intensity in comparison with the same weight of unstabilized red beet dye. The stability of color is surprisingly and advantageously lengthened with respect to stability towards heat and stability towards ultraviolet light exposure when using the stabilized composition.

More specifically the ranges of stabilizer material and particular stabilizer material useful in connection with our invention are as follows:

1. Based upon 100 parts by weight of 68° BRIX Beet Juice Concentrate, Ascorbic Acid (or derivative thereof, e.g. sodium ascorbate or isoascorbic acid): 15-30 parts by weight;

2. Based upon 100 parts by weight of 68° BRIX Beet Juice Concentrate; phosphate such as sodium hexametaphosphate, tetrasodiumpyrophsophate, tribasic sodium phosphate, or monobasic sodium phosphate: 10-30 parts by weight;
3. Based upon 100 parts by weight of 68° BRIX Beet Juice Concentrate; ethylenediaminetetraacetic acid and/or salt thereof such as calcium disodiumethylene-diaminetetraacetate: 0-20 parts by weight.

The stabilized red beet dye will have a 15-35% less initial color intensity in comparison with the same weight of unstabilized red beet dye, but there is a great shelf-life gain from the standpoint of heat and ultraviolet light stabilization.

Our invention also relates to the addition of caramel color to the stabilized red beet dyestuff composition whereby the final system is not only augmented or enhanced with regard to the red sheen thereof, but is given a stability factor substantially identical to that of the well-known synthetic dyestuffs.

The term "beet" is intended herein to mean any of the various biennial plants of the chenopodiaceous family, genus beta including the red beet, the root of which contains the red, violet and yellow naturally occurring pigments, betacyanins and betaxanthins.

Production of red beet dyes as they are intended to be used herein is set forth in detail in the following publications:

(i) Food Research, 25 (3) 429 (1960) (Peterson and Joslyn, "The Red Pigment of the Root of the Beet (beta vulgaris) as a Pyrrole Compound");

(ii) Journal of Food Science, Vol. 41, 78 (1976) Further (Adams, et al, "Production of a Beta Cyanine Concentrate by Fermentation of Red Beet Juice with Candida Utilis").

Solutions of dyes produced in this manner, however, include in addition to the red coloration, a blue or violet sheen or hue which causes the solutions to be unacceptable for a number of food applications; and furthermore, such solutions are unstable from a commercial standpoint to exposure to heat and to ultraviolet radiation.

Novel stabilized coloring compositions of the present invention in solution give rise to a stable red color without the aforestated blue or violet sheen or hue, and may, thus, be used for many purposes, but they are particularly useful for coloring food. Synthetic coal tar colors which are obviously more stable than the unstabilized red beet colors have been widely used for food coloring and, while satisfactory from both a color and a cost standpoint, they have been determined to be unsuitable for use in foodstuffs in high concentrations. Thus, there has been a long need in the art for food coloring agents which are stable and which have the coloring attributes of coal tar derivatives, but which are acceptable for use in conjunction with foodstuffs, chewing gums and medicinal products.

The coloring compositions made in accordance with the present invention posses excellent stability properties as well as excellent food coloring properties and are inexpensive and non-toxic. By following the process of the present invention, it is possible to prepare stable coloring compositions from naturally grown red beet vegetables which contain natural red pigments that are distinctive in color, stable and intense in color, and are aesthetically pleasing to the eye in view of the absence of the characteristics blue or violet sheen or hue with which red beet dye is commonly associated.

Thus, it is commonly known that there are present in certain vegetables, pigments which if extracted can be used to color other materials and, in particular, other foods. The prior art food coloring compositions prepared from pigments extracted from normally grown vegetables such as the red beet are subject to several shortcomings. Many of these compositions change color or discolor during normal shelf life; others are expensive due in part to the fact that it is necessary to heat the compositions during preparation to improve the stability and solubility of the naturally occurring pigments; while others do not have sufficient coloring power for practical economic use. The betalaine containing compositions of the present invention are subject to none of these deficiencies provided that ascorbic acid or a derivative thereof such as erythorbic acid or sodium erythorbate or sodium ascorbate is used in conjunction with a phosphate such as sodium hexametaphosphate and, optionally, ethylenediamine-tetraacetic acid or a salt thereof is contained therein.

Natural color is commonly extracted from normally grown vegetables such as the red beet by means of a simple aqueous extraction process. The resulting product is commonly designated as an extract or juice concentrate of the vegetable. Depending on the solvents used, the technique employed in the extraction process, and the quality of the raw material, the extract may contain a greater or lesser proportion of the coloring matter, essential oils and other constituents normally present in the red beet. One property which is used to indicate the quality of an extract is a rating known as color units or color value, a value obtained spectrophotometrically using a spectrophotometer (or simple colorimeter) by measuring the effective transmission of monochromatic light through a liquid sample. A spectrophotometer contains a source of white light and an optical system capable of separating the light into any wave length of its spectrum. The effective transmission of monochromatic light through a liquid is obtained by interposing the liquid in the light path of the instrument whereby light of the selected wave length is passed through the liquid and strikes a photosensitive vacuum tube; the resultant electronic signal is amplified and displayed on an indicator, calibrated in percent transmittance or absorbance.

The liquid sample is prepared by weighing analytically 100 mg of the extract into a 100 milliliter volumetric flask which is then brought up to volume by adding the proper amount of solvent (such as distilled water with red beet extract). The effective transmission of this liquid sample is determined by selecting light of a definite wave length depending on the nature of the extract of which the color value is being determined (e.g. 535 millimicrons for beet) and standardizing the spectrophotometer against a reference liquid or "blank" corresponding to the solvent used to prepare the liquid sample. The spectrophotometer is adjusted to read 100% transmittance for the reference liquid; a measurement is then taken of the liquid sample and a value thus obtained (which represents the ratio of the two measurements) is the percent transmittance of the liquid. The percent transmittance is expressed in color values using predetermined standards established in the trade.

The described method for determining the color values of extracts may also be used to determine the color values of the finished coloring solutions of the present invention.

In another aspect of the process of the present invention, a coloring composition may be prepared by admixing a composition comprising (i) from about 2.5 up to about 15% by weight of a natural caramel color, (ii) from about 85% up to about 97.5% by weight of red beet dye, containing from about 55% up to about 77% by weight of soluble solids, the remainder being water, and (iii) a stabilizing composition containing ascorbic acid, a salt thereof or erythorbic acid or a salt thereof; a phosphate such as sodium hexametaphosphate; and, optionally, ethylenediaminetetraacetic acid or a salt thereof such as calcium disodiumethylenediaminetetraacetate in an amount of from about 4% up to about 8% (total stabilizing composition on a solid basis).

After the coloring composition in liquid form is produced, it may be combined with one or more spray-drying aids such as gum arabic and maldodextrins, or the solution may be encapsulated by standard coacervation techniques in edible materials using gelatin. The resulting spray-dried product may then be added to foodstuffs, chewing gums or medicinal products; or the resulting liquid composition may be added to foodstuffs, chewing gums or medicinal products in conjunction with other materials such as flavoring adjuvants.

The standards by which the coloring compositions of our invention are compared to those of the prior art are particularly described in the text: "Food Colorimetry: Theory and Application" by Francis and Clydesdale, the AVI Publishing Company, Inc. (1975).

The following examples are given to illustrate our invention. These examples are not intended to be limiting but are only intended to represent preferred embodiments of our invention. It will, of course, be appreciated that in practicing these preferred embodiments of the process of the present invention, it is not critical which of the premix solutions is prepared first.

The following table sets forth symbols and abbreviations as used in the examples of our invention:

| Symbol/Abbreviation | Description |
|---|---|
| SHMP | Sodium hexametaphosphate |
| TSPP | Tetrasodium pyrophosphate |
| SAPP | Sodium acidpyrophosphate |
| Na$_2$EDTA | Disodium ethylenediaminetetraacetic acid |
| EDTA | Ethylenediaminetetraacetic acid |
| CaNa$_2$EDTA | Calcium disodium salt of EDTA |
| ++++ | Dark red color |
| +++ | Red color |
| ++ | Pink color |
| + | Light orange, pink color |
| − | Yellow color |

EXAMPLE I

Red beet extract is prepared by extracting 500 kg of ground red beets with 500 kg of water. After separating the liquid from the solid phase, the aqueous extracts are concentrated to approximately 50 kg.

687 Grams of red beet extract (soluble solids content 68%) is then intimately admixed with 34.35 grams of a commercially available caramel color designated as "Caramel MD." In addition, 120 parts by weight of ascorbic acid, and 120 parts by weight of tetrasodium-pyrophosphate is added. The resulting mixture is added to 2,000 grams of water and 1,100 grams of gum arabic. After homogenization, the entire mixture is spray dried on a "NIRO Atomizer" manufactured by the NIRO Atomizer Company of Copenhagen, Denmark, (inlet temperature 380° F, outlet temperature 180° F) to yield a powder having a red color quality equivalent to the color quality of red dye F.D.&C #2. No blue or violet hue or sheen is observed in the liquid phase. The final product has a stability to ultraviolet light and heat substantially equivalent to that of red dye F.D.&C #2.

Substantially identical results are achieved when "Caramel MD" is replaced by any of the following caramel colors:

(i) B&C 145 Caramel Color (Tinctorial Power, K$_{0.56}$ (0.1% solution absorbance/cm at 560 mμ) 0.242, Hue Index, 4.79; specific gravity at 60° F, 1.3182; percent dry substance, 63.5; pH 3.2) manufactured by Sethness Products Company of 444 Lake Shore Drive, Chicago, Illinois 60611;

(ii) Hi Acid Proof 150 Caramel Color (Tinctorial Power, K$_{0.56}$ (0.1% solution absorbance/cm at 560 mμ) 0.162, Hue Index, 4.47; specific gravity at 60° F, 1.3242; pH, 2.9; percent dry substance 66.4) manufactured by Sethness Products Company;

(iii) Acid Proof 100 Caramel Color (Tinctorial Power, K$_{0.56}$ (0.1% solution absorbance/cm at 560 mμ) 0.109, Hue Index, 4.63; specific gravity at 60° F, 1.3182; pH, 2.9; percent dry substance, 63.5) manufactured by Sethness Products Company of Chicago, Ill.

Other caramel color products that may be used are specifically described in Peck, "Caramel Color/Its Properties And Its Uses," reprinted from "Food Engineering" March, 1955, McGraw-Hill Publishing Company, New York, N. Y.

EXAMPLE II

687 Grams of beet extract (soluble solids content 68%) produced according to Example I, are intimately admixed with 34.35 grams of "Caramel MD," 120 grams of ascorbic acid, 120 grams of sodium hexametaphosphate, and 50 grams of ethylelediamine-tetraacetic acid, 2,000 grams of water and 1,000 grams of Gum Arabic. The resulting mixture is spray-dried in accordance with the procedure set forth in Example I. No blue or violet hue or sheen is observed in the liquid phase. The resulting powder has a stability equivalent to that powder produced according to Example I.

Substantially identical results are achieved when "Caramel MD" is replaced by any of the caramel colors listed in Example I, to wit:

(i) B&C 145 Caramel Color (Tinctorial Power, K$_{0.56}$ (0.1% solution absorbance/cm at 560 mμ) 0.242, Hue Index, 4.79; specific gravity at 60° F, 1.3182; percent dry substance, 63.5; pH, 3.2) manufactured by Sethness Products Company of 444 Lake Shore Drive, Chicago, Ill. 60611;

(ii) Hi Acid Proof 150 Caramel Color (Tinctorial Power, K$_{0.56}$ (0.1% solution absorbance/cm at 560mμ) 0.162, Hue Index, 4.47; specific gravity at 60° F, 1.3242; pH, 2.9; percent dry substance, 66.4) manufactured by Sethness Products Company;

(iii) Acid Proof 100 Caramel Color (Tinctorial Power, K$_{0.56}$ (0.1% solution absorbance/cm at 560 mμ) 0.109, Hue Index, 4.63, specific gravity at 60° F, 1.3182, pH 2.9; percent dry substance, 63.5) manufactured by Sethness Products Company of Chicago, Ill.

Other caramel color products that may be used are specifically described in Peck, "Caramel Color/Its Properties and Its Uses," reprinted from "Food Engineering" March, 1955, McGraw-Hill Publishing Company, New York, N.Y.

EXAMPLE III

The liquid mixture of Example I is added to milk at the rate of 3 grams per liter and to yogurt at the rate of 3 grams per liter. Compared to using normal beet extract without the addition of caramel, the color rating of the food containing the dye produced with the caramel is redder in tint compared to when used without the caramel. The same result occurs using the product of Example II.

EXAMPLE IV

Absorbance of stabilized red beet juice, caramel color, and mixtures of stabilized beet juice and caramel at 535 nanometers (millimicrons) is measured as set forth below using a Beckman Grating Spectrophotometer (Model DB-G), a scanning spectrophotometer, at a wavelength of 400–700 millimicrons. This range is the range of incandescent light transmission. The stabilized beet juice concentrate (stabilized as follows: 22 parts by weight of ascorbic acid is admixed with 20 parts by weight of tetrasodiumpyrophosphate and 20 parts by weight of sodium hexametaphosphate, and the resulting mixture is added to 100 parts by weight of 68° BRIX beet juice) used in 68% soluble solids, pH 4.30, with citric acid added. The caramel color is Acid Proof 75, manufactured by the Sethness Products Company. The results are set forth in the following Table I.

Table I

| Mixture & Dilution | pH | Absorbance At 535 Nanometers | Qualitative Appearance |
|---|---|---|---|
| Mixture "A:" 1 gram caramel color liquid and 9 grams beet juice concentrate diluted with distilled water to 1.0 grams per liter. | 4.30 | 0.485 | A red color but violet hue not present |
| Mixture "B:" 9 grams beet juice concentrate diluted with distilled water to 0.9 grams per liter. | 4.32 | 0.455 | A red color with violet hue present |
| Mixture "C:" 1 gram caramel color diluted with distilled water to 0.1 grams per liter | 3.39 | 0.048 | A yellow color |
| Mixture "D:" 10 grams beet juice concentrate diluted with distilled water to 1.10 grams per liter. | 4.32 | 0.530 | A red color with a violet hue present |

FIG. 13 represents a graph of absorbance versus wave length for Mixture "A." FIG. 14 illustrates graphs of absorbance versus wave length for mixtures "B" and "C." FIG. 15 represents a graph of absorbance versus wave length for mixture "D."

The red beet juice concentrate is produced by Takasago Perfumery Co., Ltd, of Tokyo, Japan. It has the following specifications:

"RED BEET JUICE CONCENTRATE SPECIFICATIONS

| | |
|---|---|
| 1. Appearance | Red purple or dark red solution |
| 2. Taste and Flavor | No off-taste and off-flavor, except for those originated from Red beet Juice shall be observed. |
| 3. Color Value | Not less than E-Value 5.5. Weight accurately 100 mg of sample and dilute up to make 100 ml with distilled water. Measure - log T value of the prepared solution as a reference at the wave length of 532 m in 10 mm light path cells. Calculate $E_{1cm}^{1\%}$ by using the following equation. $$E\text{-Value}\ (E_{1cm}^{1\%}) = \frac{-\log T}{\text{Weight of sample (g)}}$$ |
| 4. Hue | Reads the whole range of visible spectrum absorbance by spectrophotometer for the determination of color value and also for the observation of hue. The visible spectrum of the aqueous solution of this sample shows max at or around 532 m, and almost does not give a peak around 480 m. |
| 5. Brix | Not less than 70°. |
| 6. Heavy Metals | Less than 10 ppm (as Pb). |
| 7. Arsenic | Less than 2 ppm (as $As_2O_3$). |
| 8. Artificial Colors | Not contained. |
| 9. Bacteria Logicality | Total viable cells less than 3,000/g. Molds and Yeasts negative. Coliform Bacteria negative. |
| 10. Foreign Materials | Not contained. |
| 11. Other substances | Any substances detrimental to human health should not contained." |

Examples indicating heat stability and stability to ultraviolet light using stabilizing compositions:

EXAMPLE V

BEET COLOR STABILIZATION USING ASCORBIC ACID

To 100 ml each of a beet color solution containing 0.67 gm of beet juice concentrate (68° Prix, 0.7% betanin), 0.1 gm of ascorbic acid was added. For heat stability study, 15 ml each of the beet color solutions were placed in test tubes (18 × 150 mm) and heated in a water bath at 93" C for 20 minutes. The color absorbance of the heated solutions was measured at 535 nm using a Bausch & Lomb Spectronic 20 spectrophotometer. Color retention of heated solution was calculated based using the following formula:

$$\%\text{ color retention} = \frac{\text{absorbance of heat treated sample}}{\text{absorbance of original solution}} \times 100$$

The color retention in a control with no additive and the test solutions after being heated for 20 minutes at 93° C was as follows:

|  | pH | % color retention |
|---|---|---|
| Control | 4.66 | 20% |
| Ascorbic acid 0.1% | 3.80 | 54.7% |

EXAMPLE VI

COMPARISON OF COLOR STABILIZING EFFECT OF SODIUM HEXAMETAPHOSPHATE, TETRASODIUMPYROPHOSPHATE AND SODIUM ACID PYROPHOSPHATE 0.1 Grams each of sodiumhexametaphosphate, tetrasodiumpyrophosphate and sodiumacidpyrophosphate were added separately to a beet color solution containing 0.67 gm of beet juice concentrate (68° Brix, 0.7% betanin). These solutions in test tubes (15 ml each) were heated in a water bath (99° ± 1° C) for 5, 10, 15 and 20 minutes. After heating, the tubes were cooled immediately in ice water. The absorbance of heated solutions was measured at 535 mm using Spectronic 20 spectrophotometer. Due to tetrasodiumpyrophosphate produced a solution with a pH of 8.88. The pH of heated solutions was adjusted to 4.3–4.5 by the addition of citric acid powders.

For light stability test, another set of this series of solutions in test tubes was exposed to a short wave U.V. light at a distance of 7 cm from the light.

The color retention results of these tests are as follows:

| Heating Time (min.) | % Retention of Beet Color | | | |
|---|---|---|---|---|
|  | Control | SHMP | TSPP | SAPP |
|  | pH 4.61 | 532 | 8.88 | 4.55 |
| 0 | 100 | 100 | 100 | 100 |
| 5 | 32.8 | 68.6 | 26.0 | 36.5 |
| 10 | 15.3 | 44.8 | 14.8 | 16.4 |
| 15 | 10.1 | 27.5 | 11.5 | 10.1 |
| 20 | 7.7 | 13.1 | 9.6 | 7.4 |
| UV Light Exposure |  |  |  |  |
| 0 | ++++ | ++++ | ++++ | ++++ |
| 6 | + | ++ | − | ++ |
| 9 | − | + | − | − |

Results show when a polyphosphate was used by itself, sodiumhexametaphosphate is a more effective beet color stabilization agent than tetrasodiumpyrophosphate or sodiumacidpyrophosphate.

EXAMPLE VII

COMPARISON OF COLOR STABILIZATION EFFECT OF SODIUM HEXAMETAPHOSPHATE AND TETRASODIUMPYROPHOSPHATE IN COMBINATION WITH ASCORBIC ACID AND EDTA

To 100 ml each of a beet color solution containing 0.67 gm of beet juice concentrate (68° Prix, 0.7% betanin) the following chemical additives were added separately:

| 1. Control | pH = 4.58 |
|---|---|
| 2. 0.1 gm ascorbic acid, 0.1 gm Na$_2$EDTA, 0.1 gm tetrasodium-pyrophosphate | pH = 6.1 |
| 3. 0.1 gm ascorbic acid, 0.1 gm Na$_2$EDTA, 0.1 gm sodiumhexameta-phosphate | pH = 4.0 |
| 4. 0.1 gm ascorbic acid, 0.1 gm EDTA acid, 0.1 gm tetrasodium-pyrophosphate | pH = 4.8 |

These solutions were tested for heat stability as described in Example VI. For light stability test, another set of test tubes containing 15 ml each of the test solutions including a control were displayed 4 cm away in front of a fluorescent light assembly at room temperature (21–25° C). The heat from the light raised the solution temperature about 3° C. The light assembly contains two 15 watt blubs. It is the light assembly commonly used for photopolymerization of gel columns. The color of the solutions was examined visually every day.

The color retention results of these tests are as follows:

| Heating Time (min.) | Control | Percent Retention of Beet Color | | |
|---|---|---|---|---|
|  |  | 0.1% Ascorbic Acid 0.1% Na$_2$EDTA 0.1% TSPP | 0.1% Ascorbic Acid 0.1% Na$_2$EDTA 0.1% TSPP | 0.1% Ascorbic Acid 0.1% Na$_2$EDTA 0.1% TSPP |
|  | pH 4.58 | 6.10 | 4.03 | 4.80 |
| 0 | 100 | 100 | 100 | 100 |
| 5 | 36.4 | 63.2 | 85.1 | 82.8 |
| 10 | 13.5 | 49.6 | 76.9 | 75.2 |
| 15 | 8.9 | 41.5 | 74.4 | 72.9 |
| 20 | 8.0 | 38.3 | 71.3 | 71.2 |
| Light Exposure |  |  |  |  |
| 0 day | ++++ | ++++ | ++++ | ++++ |
| 3 days | ++ | ++++ | ++++ | ++++ |
| 7 days | − | + | ++ | + |

The above results show that sodiumhexametaphosphate is more effective in stabilizing beet color a beet color water solution than tetrasodiumpyrophosphate. Tetrasodiumpyrophosphate is effective when the pH of the solution is lowered by the use of ethylenediaminetetraacetic acid.

EXAMPLE VIII

COMPARISON OF COLOR STABILIZATION EFFECT OF DISODIUMETHYLENEDIAMINETETRAACETIC ACID AND CALSIUM DISODIUMETHYLENEDIAMINETETRAACETIC ACID IN COMBINATION WITH ASCORBIC ACID AND SODIUM HEXAMETAPHOSPHATE

To 100 ml each of a beet color solution containing 0.67 gm of beet juice concentrate (68° Prix, 0.7% betanin) the following chemical additives are added separately:

| | |
|---|---|
| 1. Control no additives | pH = 4.76 |
| 2. 0.1 gm Na$_2$EDTA, 0.1% Ascorbic Acid, 0.1 gm sodiumhexametaphosphate | pH = 4.07 |
| 3. 0.1 gm CaNa$_2$EDTA, 0.1% Ascorbic Acid, 0.1 gm sodiumhexametaphosphate | pH = 4.72 |

The color retention in beet color solutions after heat treatment are as follows:

| Heating Time (min.) | Percent Color Retention of Beet Color | | |
|---|---|---|---|
| | No. 1 Control | No. 2 (Na$_2$EDTA) | No. 3 (CaNa$_2$EDTA) |
| 0 | 100 | 100 | 100 |
| 5 | 27.1 | 80.2 | 78.5 |
| 10 | 14.8 | 71.7 | 71.5 |
| 15 | 8.5 | 64.7 | 66.2 |
| 20 | 7.4 | 62.3 | 65.1 |

Conclusion: Na$_2$EDTA and CaNa$_2$EDTA have about the same stabilization effect to beet color.

EXAMPLE IX

COMPARISON OF COLOR STABILIZATION EFFECT OF SHMP, TSPP AND SAPP IN COMBINATION WITH ASCORBIC ACID AND CaNa$_2$EDTA

To 100 ml each of beet color solution containing 0.67 gm of beet juice concentrate (68° Prix, 0.7% betanin) the following chemical additives are added separately:

| | |
|---|---|
| 1. Control no addition | pH = 4.63 |
| 2. 0.1 gm SHMP, 0.1 gm Ascorbic Acid, 0.003 gm CaNa$_2$EDTA | pH = 4.02 |
| 3. 0.1 gm TSPP, 0.1 gm Ascorbic Acid, 0.003 gm CaNa$_2$EDTA | pH = 6.62 |
| 4. 0.1 gm SAPP, 0.1 gm Ascorbic Acid, 0.003 gm CaNa$_2$EDTA | pH = 3.82 |

These solutions are heated and exposed to light as previously described. The color retentions in the beet color solutions after treatments are as follows:

| Heating Time (min.) | Percent Retention of Beet Color | | | |
|---|---|---|---|---|
| | No. 1 Control | No. 2 (SHMP) | No. 3 (TSPP) | No. 4 (SAPP) |
| 0 | 100 | 100 | 100 | 100 |
| 5 | 30.9 | 79.0 | 46.0 | 79.4 |
| 10 | 16.0 | 70.6 | 33.6 | 71.0 |
| 15 | 10.1 | 65.6 | 25.8 | 63.0 |
| 20 | 8.3 | 57.0 | 21.4 | 54.3 |
| Light Exposure | | | | |
| 0 day | ++++ | ++++ | ++++ | ++++ |
| 6 days | + | ++ | ++ | ++++ |

The results indicate that in the combination with ascorbic acid and EDTA, SHMP is most effective to stabilize beet color in a water solution; SAPP is next; and TSPP the least.

EXAMPLE X

EFFECT OF CITRIC ACID TO THE STABILITY OF BEET COLOR

In order to determine the citric acid effect on beet color, citric acid at different levels is added to a beverage model system containing 9.12% sugar and 0.06% sodium benzoate with no citric acid. The beet color concentration is 10 gm beet juice concentrate (68° Brix, 0.7% betanin) per 1500 ml. The test solutions and a control are heated and treated as described before.

Results of color retention in these solutions are as follows:

| Heating Time (min.) | Percent Retention of Beet Color | | | | |
|---|---|---|---|---|---|
| | | % Citric Acid | | | |
| | Control | 0.017 | 0.05 | 0.1 | 0.2 |
| | pH 4.74 | 4.46 | 4.07 | 3.71 | 3.26 |
| 0 | 100 | 100 | 100 | 100 | 100 |
| 5 | 36.9 | 30.0 | 12.6 | 8.2 | 7.0 |
| 10 | 20.3 | 15.2 | 10.6 | 6.8 | 5.6 |
| 15 | 12.7 | 11.2 | 8.2 | 6.3 | 5.4 |
| 20 | 9.9 | 8.6 | 8.2 | 6.3 | 5.1 |

These results show that the presence of citric acid has a negative effect to beet color stability toward heat.

EXAMPLE XI

USING ASCORBIC ACID TO STABILIZE BEET COLOR IN A MODEL BEVERAGE SYSTEM

A model beverage system containing 9.12% sugar, 0.017% citric acid and 0.06% sodium benzoate is colored with beet juice concentrate (68° Prix, 0.7% betanin) at 10 gm/1500 ml.

Ascorbic acid is added to the above colored beverage model system at levels of 0.01, 0.02, 0.03, 0.05, 0.1, 0.2 and 0.4%. These solutions are filled into test tubes (18 × 150 mm), 15 ml per test tube, and heated in a constant temperature water bath at 99 ± 1° C for 5, 10, 15 and 20 minutes. After heating they are cooled immediately in ice water. A control which contains no ascorbic acid is heated at the same time. The color retention in these solutions are as follows:

| Heating Time (min.) | Percent Retention of Beet Color | | | | | | | |
|---|---|---|---|---|---|---|---|---|
| | | Percent Ascorbic Acid | | | | | | |
| | Control | 0.01 | 0.02 | 0.03 | 0.05 | 0.1 | 0.2 | 0.4 |
| | pH 4.50 | 4.37 | 4.31 | 4.24 | 5.10 | 4.03 | 3.82 | 3.50 |
| 0 | 100 | 100 | 100 | 100 | 100 | 100 | 100 | 100 |
| 5 | 29.1 | 62.5 | 63.0 | 62.2 | 63.7 | 64.2 | 63.2 | 51.7 |
| 10 | 15.8 | 55.3 | 56.8 | 55.3 | 54.4 | 56.2 | 54.0 | 43.9 |
| 15 | 9.5 | 50.5 | 51.4 | 51.4 | 48.9 | 49.3 | 48.0 | 37.8 |
| 20 | 7.2 | 44.7 | 46.3 | 45.0 | 43.0 | 43.6 | 42.6 | 33.3 |

For stability test toward light exposure, control and test beet color solutions, 15 ml each, are placed in test tubes (18 × 150 mm) and displayed 6 cm away in front of a fluorescent light assembly at room temperature, 22–25° C. The light assembly contains two 15 watt bulbs. It is the light assembly commonly used for photopolymerization of gel columns. The color of each beet solution is examined visually every day.

| Light Exposure | Color of Beet Solutions | | | | |
|---|---|---|---|---|---|
| | Control | Ascorbic Acid | | | |
| | | 0.05% | 0.1% | 0.2% | 0.4% |
| Initial | ++++ | ++++ | ++++ | ++++ | ++++ |
| 3 days | +++ | ++++ | ++++ | ++++ | ++++ |
| 4 days | + | +++ | +++ | ++ | +++ |
| 8 days | − | − | + | ++ | + |
| 11 days | − | − | − | + | − |

NOTE:
++++ = Dark red
+++ = Red
++ = Pink
+ = Light orange, pink
− = Yellow

Results indicate that ascorbic acid used at levels from 0.01 to 0.4% all have beet color stabilization effect. At 0.4%, the effect is not as good as at lower concentrations. At this concentration (0.4%) the pH of the system is lowered to 3.50 which is below the beet color optimum stability range (pH 4–5) and it could be one of the reasons that high concentration of ascorbic acid is not as effective.

EXAMPLE XII

BEET COLOR STABILIZATION USING ETHYLENEDIAMINETETRAACETIC ACID

A beverage model system is prepared as described in Example XI. Calcium disodium EDTA is added to the solution at levels of 0.003% and 0.005%, and the solutions are heat and light treated in the same manner as described previously. The results are as follows:

| Heating Time (min.) | Percent Color Retention | | |
|---|---|---|---|
| | Control | $CaNa_2EDTA$ | |
| | | 0.003% | 0.005% |
| | pH 4.50 | 4.49 | 4.51 |
| 0 | 100 | 100 | 100 |
| 5 | 33.5 | 40.9 | 39.5 |
| 10 | 14.7 | 23.0 | 21.2 |
| 15 | 10.8 | 13.9 | 14.4 |
| 20 | 9.0 | 11.0 | 10.1 |
| Light Exposure | | | |
| 0 day | ++++ | ++++ | ++++ |
| 8 days | − | + | + |

Results indicate that $CaNa_2EDTA$ by itself does not have much beet color stabilization properties at the legal permissible level which is 0.003% in carbonated beverage.

EXAMPLE XIII

BEET COLOR STABILIZATION USING SODIUM HEXAMETAPHOSPHATE

A beverage model system is prepared using sodium hexametaphosphate as described in Example XI. Sodium hexametaphosphate is added to the solution at levels of 0.05, 0.1 and 0.2%, and the solutions are heat and light treated in the same manner as previously described. The results are as follows:

| Heating Time (min.) | Percent Color Retention | | |
|---|---|---|---|
| | Control | Sodium Hexametaphosphate | |
| | | 0.05% | 0.1% | 0.2% |
| | pH 4.60 | 4.71 | 4.73 | 5.05 |
| 0 | 100 | 100 | 100 | 100 |
| 5 | 30.6 | 46.5 | 48.3 | 48.3 |
| 10 | 17.7 | 26.7 | 29.1 | 29.9 |
| 15 | 12.0 | 16.8 | 19.4 | 18.8 |
| 20 | 9.8 | 11.9 | 13.0 | 13.3 |
| Light Exposure | | | | |
| 0 day | ++++ | ++++ | ++++ | ++++ |
| 9 days | − | + | + | + |

Results show that the addition of sodiumhexametaphosphate reduces beet color degradation rate at the early stage of heat treatment. Higher concentration shows slightly better stabilization effect, but there is no significant difference between 0.1 and 0.2%. At 0.2% of sodiumhexametaphosphate, the pH of the beverage is above 5.00 which is not desirable for this beverage system.

EXAMPLE XIV

USING RESPONSE SURFACE METHODOLOGY TO OPTIMIZE THE COMBINATION OF ASCORBIC ACID, SODIUM HEXAMETAPHOSPHATE AND ETHYLENEDIAMINETETRAACETIC ACID FOR BEET COLOR STABILIZATION

Response Surface Method was used first to set up the experiment design. The experimental design is derived by the computer program RSM (Response Surface Methodology) of the Compu-Serv Co. The following controlled factors and limits are used to derive the experimental design:

| Factor 1 | Ascorbic Acid | 0.000% to 0.200% |
|---|---|---|
| Factor 2 | Sodium Hexametaphosphate | 0.000% tp 0.200% |
| Factor 3 | $CaNa_2EDTA$ | 0.000% to 0.004% |

The characteristics to be measured are:

| Characteristic 1 | Color retention - heat |
|---|---|
| Characteristic 2 | Color retention - light |

The experimental design consists of a series of 15 experiments as shown below.

In this series of experiments the model beverage system is used which contains 9.12% sugar, 0.017% citric acid, 0.06% sodium benzoate with beet color added at the level of 2 gm of beet juice concentrate (68° Brix, 0.7% betanin) per 1500 ml of beverage. The heat stability study procedure as described previously is followed. The light stability study procedure is the same as before except actual color absorbance readings at 535 nm are taken after 7 days of light exposure. Percent color retention after light exposure is calculated in the same manner for heat stability study.

Results of this series of experiments are analyzed by the characteristic optimization phase of the Response Surface Methodology. The optimized combination of factor (ascorbic acid, sodium hexametaphosphate and $CaNa_2$ EDTA) and response surface contour plots are shown below and attached.

I. In the beverage system, a maximum heat stability may be achieved to obtain a 56.37% color retention after heating at 99 ± 1° C for 20 minutes by using the following combination of additives in the beverage:

| | |
|---|---|
| Ascorbic Acid | 0.1485% |
| SHMP | 0.1307% |
| EDTA | 0.0% |

This optimum combination will also give a color retention of 20.93% under the experimental conditions used. The following table shows the comparison of color retention in the control and a test sample with the optimum combination of additives added, and both were exposed to the same treatment conditions:

| | Control | With Optimum Amount of Additives | Stability Increase |
|---|---|---|---|
| Heat Stability | 8.7% | 56.37% | 650% |
| Light Stability | 2.5% | 20.93% | 840% |

For practical purposes, the optimum combination of additives is calculated in relationship to beet juice concentrate (68° Brix) as follows:

| | |
|---|---|
| Beet juice concentrate (68° Brix) | 100 parts by weight |
| Ascorbic acid | 22.5 parts by weight |
| Sodium Hexametaphosphate | 19.8 parts by weight |

The beet juice concentrate used in our experiment contains about 0.7% betanin. If the betanin content is different, the ratio should be changed accordingly.

II. Based on the light retention data from our experiments, RSM gives us another set of optimum combination of additives which may provide a maximum light stability of 24.13% under our experimental conditions. The optimized combination is as follows:

| | |
|---|---|
| Ascorbic Acid | 0.1730 |
| SHMP | 0.1386 |
| CaNa₂EDTA | 0.0022 |

This optimum combination for light stability will give a heat stability of 45.51% of color retention. The following table shows the comparison of color retention of a test sample with above optimum additives and a control and are exposed to the same treatment conditions:

| | Control | With Optimum Amount of Additives | Stability Increase |
|---|---|---|---|
| Light stability | 2.5 | 24.13 | 970% |
| Heat stability | 8.7 | 45.51 | 520% |

Calculated in relationship to beet juice concentrate, the ratios of the additives to beet juice concentrate are:

| | |
|---|---|
| Beet juice concentrate (68° Brix) | 100 parts by weight |
| Ascorbic Acid | 26.2 parts by weight |
| SHMP | 21.0 parts by weight |
| CaNa₂EDTA | 0.3 parts by weight |

Beet Color Stabilization

A maximum light stabilization of 24.13 may be achieved while confining variable values to the ranges shown below. The "value at maximum" column contains the factor settings required to obtain the desired optimum, as well as characteristic, values which these factor settings produce.

| | Lower Bound | Value at Maximum Light Stab | Upper Bound |
|---|---|---|---|
| Factors: | | | |
| Ascorbic Acid | 0.0 | 0.1730 | 0.02000 |
| SHMP | 0.0 | 0.1386 | 0.2000 |
| EDTA | 0.0 | 0.002202 | 0.004000 |
| Characteristics | | | |
| Heat Stab | N/A | 45.51 | N/A |
| Light Stab | N/A | 24.13 | N/A |
| Optimization Proceeded from the Following Original Factor Settings: | | | |
| Ascorbic Acid | 0.1000 | | |
| SHMP | 0.1000 | | |
| EDTA | 0.002000 | | |

Beet Color Stabilization

A maximum heat stabilization of 56.37 may be achieved while confining variable values to the ranges shown below. The "value at maximum" column contains the factor settings required to obtain the desired optimum, as well as characteristic, values which these factor settings produce.

| | Lower Bound | Value at Maximum Heat Stab | Upper Bound |
|---|---|---|---|
| Factors | | | |
| Ascorbic Acid | 0.0 | 0.1485 | 0.2000 |
| SHMP | 0.0 | 0.1307 | 0.2000 |
| EDTA | 0.0 | 0.0 | 0.004000 |
| Characteristics | | | |
| Heat Stab | N/A | 56.87 | N/A |
| Light Stab | N/A | 20.93 | N/A |
| Optimization Proceeded from the Following Original Factor Settings: | | | |
| Ascorbic Acid | 0.1000 | | |
| SHMP | 0.1000 | | |
| EDTA | 0.002000 | | |

FIG. 1 represents a computerized response surface for light stabilization for the system ethylenediaminetetraacetic acid/sodium hexametaphosphate/ascorbic acid/red beet color; FIG. 2 represents a computerized response surface for light stabilizatin for the system ethylenediaminetetraacetic acid/sodium hexametaphosphate/ascorbic acid/red beet color; FIG. 3 represents a computerized response surface for light stabilization for the system ethylenediaminetetraacetic acid/sodium hexametaphosphate/ascorbic acid/red beet color; FIG. 4 represents a computerized response surface for light stabilization for the system ethylenediaminetetraacetic acid/sodium hexametaphosphate/ascorbic acid/red beet color (twenty minutes heating time); FIG. 5 represents a computerized response surface for light stabilizatin for the system ethylenediaminetetraacetic acid/sodium hexametaphosphate/ascorbic acid/red beet color (twenty minutes heating time); and FIG. 6 represents a computerized response surface for light stabilizatin for the system ethylenediaminetetraacetic acid/sodium hexametaphosphate/ascorbic acid/red beet color (twenty minutes heating time).

EXAMPLE XV

USING ISOASCORBIC ACID, SODIUM ASCORBATE AND SODIUM ISOASCORBATE IN PLACE OF ASCORBIC ACID IN THE OPTIMUM CONDITION OF BEET COLOR STABILIZATION ADDITIVES

Isoascorbic acid (erythorbic acid), sodium ascorbate, and sodium isoascorbate (sodium erythorbate) are used in place of ascorbic acid in the optimum combination of additives to stabilize beet color. Model beverage system as previously described is used. The additives are the combinations of erythorbic acid and SHMP, sodium ascorbate and SHMP, and sodium erythorbate and SHMP. The concentrations used are:

| Ascorbic acid (or others) | 0.1485% |
|---|---|
| SHMP | 0.1319% |

The heat and light stability studyes are conducted in the same manner as previously described.

The results are shown in the following table:

| Heating Time (min.) | Percent Color Retention ||||
|---|---|---|---|---|
| | Control | Ascorbic Acid | Erythorbic Acid | Sodium Ascorbate | Sodium Erythorbate |
| | pH 3.62 | 3.57 | 3.58 | 4.21 | 4.24 |
| 0 | 100 | 100 | 100 | 100 | 100 |
| 5 | 16.3 | 67.7 | 68.7 | 69.5 | 69.8 |
| 10 | 13.3 | 60.0 | 61.2 | 63.7 | 63.3 |
| 15 | 11.6 | 49.6 | 53.0 | 58.7 | 57.7 |
| 20 | 8.5 | 43.5 | 43.3 | 49.5 | 49.7 |

The results show that sodium ascorbate, isoascobic acid (erythorbic acid) and sodium isoascorbate (sodium erythorbate) all can be used in place of ascorbic acid to stabilize beet color with about the same degree of effectiveness.

EXAMPLE XVI

USING TETRASODIUMPHYROPHOSPHATE IN PLACE OF SODIUMHEXAMETAPHOSPHATE IN THE OPTIMUM COMBINATION OF STABILIZATION ADDITIVES

Model beverage system as previously described is used. Tetrasodiumpyrophosphate is used with ascorbic acid at the optimum combination concentrations in place of sodiumhexametaphosphate. The heat and light stability studies are conducted by the same procedure as described in previous examples.

The results are shown in the following table:

| Heating Time (min.) | Percent Color Retention |||
|---|---|---|---|
| | Control | SHMP | TSPP |
| | pH 3.58 | 3.57 | 4.65 |
| 0 | 100 | 100 | 100 |
| 5 | 16.3 | 67.1 | 67.9 |
| 10 | 13.3 | 60.0 | 59.2 |
| 15 | 11.6 | 49.6 | 50.0 |
| 20 | 8.5 | 43.5 | 46.0 |
| Light Exposure | | | |
| 0 days | 100 | 100 | 100 |
| 7 days | 2.6 | 20.8 | 39.2 |

BRIEF DESCRIPTION OF THE DRAWINGS

FIG. 4 represents a computerized response surface for light stabilization for the system ethylenediaminetetraacetic acid/sodium hexametaphosphate/ascorbic acid/red beet color (twenty minutes heating time), as discussed in Example XIV.

FIG. 5 represents a computerized response surface for light stabilization for the system ethylenediaminetetraacetic acid/sodium hexametaphosphate/ascorbic acid/red beet color (twenty minutes heating time), as discussed in Example XIV.

FIG. 6 represents a computerized response surface for light stabilization for the system ethylenediaminetetraacetic acid/sodium hexametaphosphate/ascorbic acid/red beet color (twenty minutes heating time), as discussed in Example XIV.

FIG. 7 represents a comparative pair of graphs of color retention percentage versus heating time (minutes) of red beet dye without stabilizer versus red beet dye with 0.1% ascorbic acid stabilizer.

FIG. 8 represents a comparison of graphs of color retention versus heating time (minutes) of red beet dye without stabilizer versus red beet dye with either of sodium hexametaphosphate, tetrasodiumpyrophosphate or sodium acid pyrophosphate (0.1% in solution).

FIG. 9 represents a comparative graph of stabilized red beet dye versus non-stabilized red beet dye (color retention versus heating time), the stabilized red beet dye containing either calcium disodiumethylenediaminetetraacetate or disodiumethylenediaminetetraacetate.

FIG. 10 represents a comparision of graphs of color retention versus heating time for non-stabilized red beet dye versus red beet dye stabilized with 0.1% calcium disodiumethylenediaminetetraacetate, 0.1% sodium hexametaphosphate, and 0.1% ascorbic acid, and red beet dye stabilized with 0.1% disodiumethylenediaminetetraacetate, 0.1% sodium hexametaphosphate and 0.1% ascorbic acid.

FIG. 11 is a comparison of three stabilized red beet dye systems and a non-stabilized red beet dye system, color retention versus heating time. The systems are:

Figure 1:
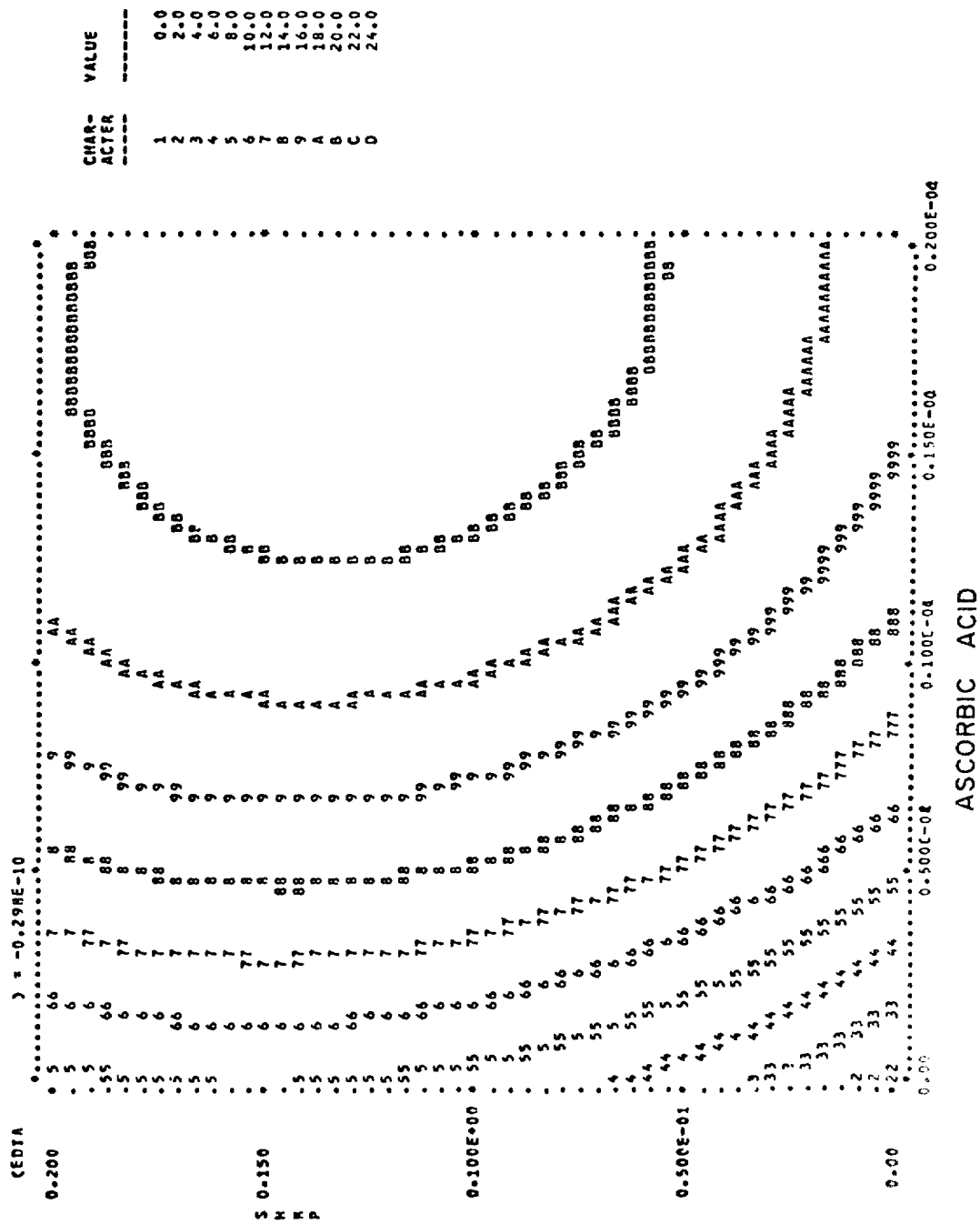
FIG. 1 represents a computerized response surface for light stabilization for the system ethylenediaminetetraacetic acid-sodium hexametaphosphate-ascorbic acid-red beet color, as discussed in Example XIV.
Figure 2:
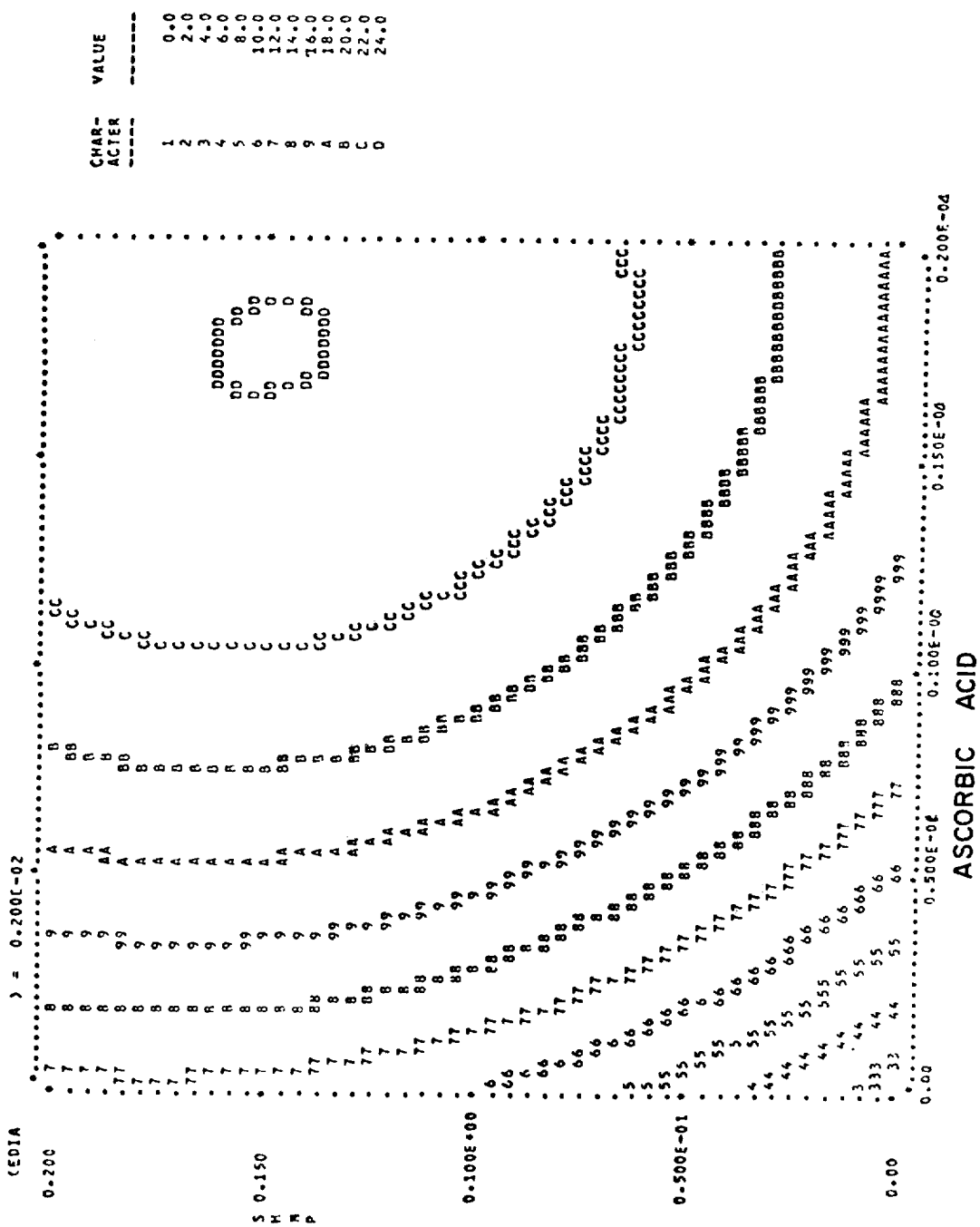
FIG. 2 represents a computerized response surface for light stabilization for the system ethylenediaminetetraacetic acid/sodium hexamethaphosphate/ascorbic acid/red beet color, as discussed in Example XIV.
Figure 3:
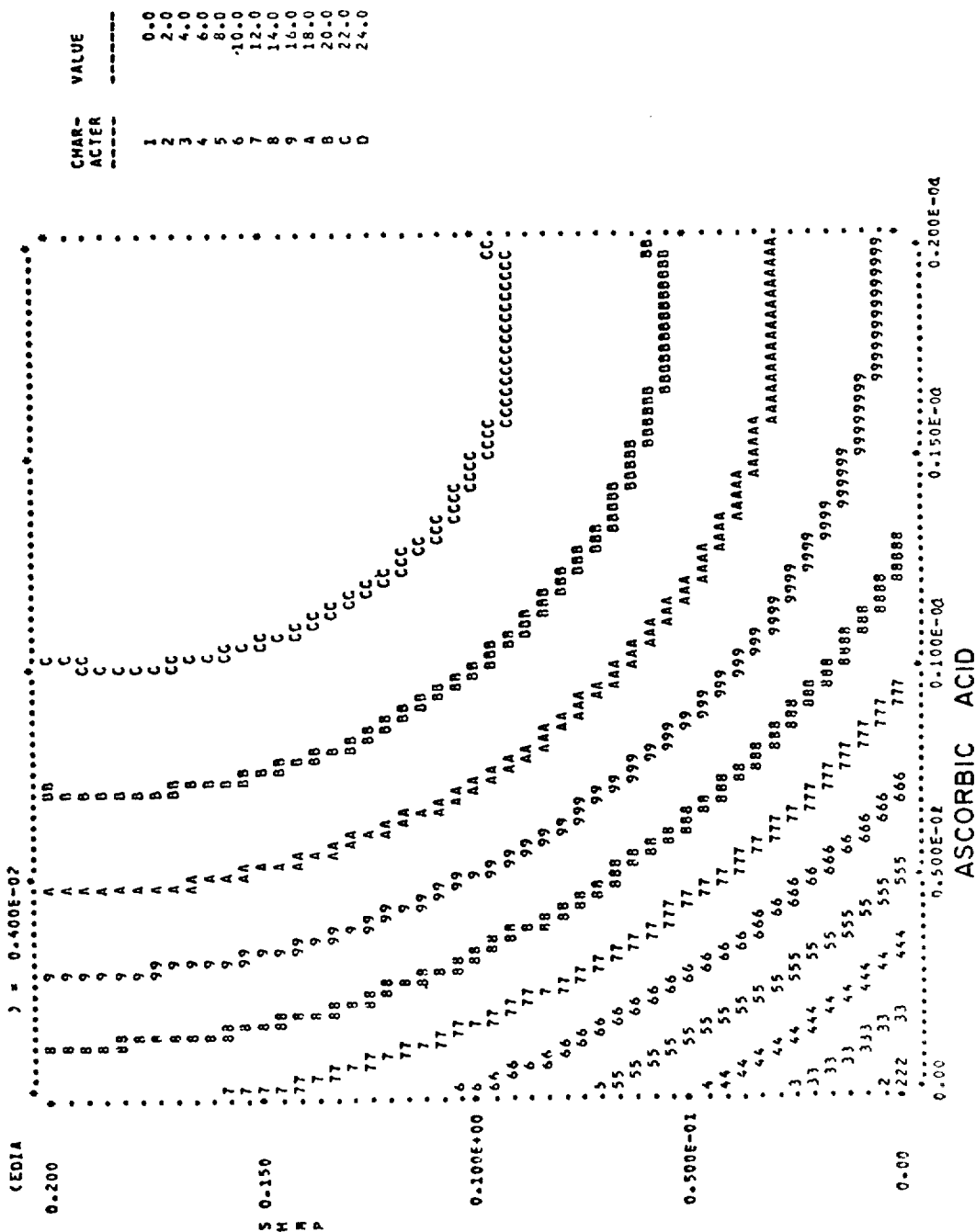
FIG. 3 represents a computerized response surface for light stabilization for the system ethylenediaminetetraacetic acid/sodium hexametaphosphate/ascorbic acid/red beet color, as discussed in Example XIV.

(A)
 0.1% sodium hexametaphosphate,
 0.1% disodiumethylenediaminetetraacetate, and
 0.1% ascrobic acid;

(B)
 0.1% trisodiumpyrophosphate,
 0.1% ethylenediaminetetraacetic acid, and
 0.1% ascorbic acid;

(C)
 0.1% trisodiumpyrophosphate,
 0.1% disodiumethylenediaminetetraacetate, and
 0.1% ascorbic acid.

FIG. 12 represents a comparison of four graphs of color retention versus heating time, three of the graphs showing stabilized systems and the fourth graph showing a non-stabilized red beet dye system. The three stabilized systems are:

(A)
    0.003% calcium disodiumethylenediaminetetraacetate,
    0.10% sodium hexametaphosphate,
    0.10% ascorbic acid;

(B)
    0.003% calcium disodiumethylenediaminetetraacetate,
    0.10% sodium acid pyrophosphate,
    0.10% ascorbic acid;

(C)
    0.003% calcium disodiumethylenediaminetetraacetate,
    0.10% trisodiumpyrophosphate,
    0.10% ascorbic acid.

FIG. 13 represens a graph of absorbance versus wave lengths in millimicrons (nanometers) for mixture "A" (one gram caramel color and 9 grams stabilized beet juice concentrate diluted to 1.0 grams per liter) of Table I of Example IV.

FIG. 14. represents a graph of absorbance versus wave length in millimicrons (nanometers) for mixture "B" (nine grams stabilized beet juice concentrate, diluted to 0.9 grams per liter) and mixture "C" (one gram caramel color diluted to 0.1 grams per liter) in Table I of Example IV.

FIG. 15 represents a graph of absorbance versus wave length in millimicrons (nanometers) for mixture "D" (ten grams stabilized beet juice concentrated, diluted to 1.0 grams per liter) in Table I of Example IV.

What is claimed is:

1. A composition having a stabilized red color comprising 100 parts by weight of red beet dye at 68° Brix and intimately admixed therewith an acid selected from the group consisting of ascorbic acid and erythorbic acid, the quantity range of said acid in said composition being from 15 to 30 parts by weight, and sodium hexametaphosphate, the quantity of said sodium hexametaphosphate being from 10 parts to 30 parts by weight of said composition, whereby said ascorbic acid derivative in combination with said sodium hexametaphosphate creates a light and heat stabilization effect on said red beet dye.

2. The composition of claim 1 having additionally added thereto ethylenediaminetetraacetic acid the quantity of ethylenediaminetetraacetic acid in said composition an effective amount of less than 20 parts by weight of said composition.

3. The composition of claim 1 wherein the acid is ascorbic acid.

4. The composition of claim 1 having an enhanced red color without a blue or violet sheen, having added thereto a caramel color.

5. A process for producing a dry dyestuff adjuvant for foodstuffs, said dyestuff being a red beet dye comprising the step of intimately admixing the composition of claim 1 with gum arabic and spray-drying the resulting composition.

6. The process for producing a dry dyestuff-containing additive for foodstuffs, said dyestuff being red beet dyestuff comprising the step of intimately admixing the composition of claim 1 with gelatin and encapsulating the resulting mixture by coacervating techniques whereby encapsulated color particules are produced.

7. A process comprising the step of intimately admixing a colorless foodstuff with the composition of claim 1 whereby a foodstuff having a red color which is stabilized is obtained.

* * * * *